US010234750B2

(12) United States Patent
Chu et al.

(10) Patent No.: US 10,234,750 B2
(45) Date of Patent: Mar. 19, 2019

(54) PROJECTOR AND LIGHT SOURCE MODULE HAVING FLOW GUIDE DEVICE

(71) Applicant: Coretronic Corporation, Hsin-Chu (TW)

(72) Inventors: Wen-Hao Chu, Hsin-Chu (TW); Te-Tang Chen, Hsin-Chu (TW); Tsung-Ching Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/596,696

(22) Filed: May 16, 2017

(65) Prior Publication Data

US 2017/0336702 A1 Nov. 23, 2017

(30) Foreign Application Priority Data

May 17, 2016 (CN) .......................... 2016 1 0328044

(51) Int. Cl.
G03B 21/16 (2006.01)
G03B 21/00 (2006.01)
G03B 21/20 (2006.01)
H04N 9/31 (2006.01)

(52) U.S. Cl.
CPC ........... G03B 21/16 (2013.01); G03B 21/005 (2013.01); G03B 21/2093 (2013.01); H04N 9/3144 (2013.01)

(58) Field of Classification Search
CPC .............................. G03B 21/16; H04N 9/3144
See application file for complete search history.

(56) References Cited

U.S. PATENT DOCUMENTS

| 7,972,013 | B2 * | 7/2011 | Soma | F21V 29/02 352/202 |
|---|---|---|---|---|
| 8,132,924 | B2 | 3/2012 | Nishi et al. | |
| 8,596,796 | B2 | 12/2013 | Namba et al. | |
| 8,820,938 | B2 * | 9/2014 | Tanaka | F21V 29/02 353/57 |
| 8,919,964 | B2 * | 12/2014 | Miyata | F21V 29/02 313/423 |
| 9,285,663 | B2 | 3/2016 | Yamashita | |
| 9,335,615 | B2 | 5/2016 | Tateno | |
| 9,366,947 | B2 * | 6/2016 | Miyata | F21V 29/02 |
| 2008/0218050 | A1 * | 9/2008 | Soma | F21V 29/02 313/35 |
| 2011/0216287 | A1 * | 9/2011 | Kitamura | G03B 21/16 353/61 |

(Continued)

Primary Examiner — Bao-Luan Q Le

(57) ABSTRACT

A light source module of a projector includes a light source having a lamp axis, a fan for providing a cooling airflow, and a flow guide device disposed between the light source and the fan and for guiding the cooling airflow. The flow guide device includes a first air channel connected between a side of the light source and an air outlet of the fan, a second air channel connected between another side of the light source and the air outlet of the fan, and a first airflow control assembly disposed in the first air channel and for controlling the first air channel either in communication or non-communication states via gravity. The first airflow control assembly has a first control rotating shaft inclined relative to the lamp axis and a first included angle between the first control rotating shaft and the lamp axis is less than 90 degrees.

29 Claims, 14 Drawing Sheets

(56) References Cited

U.S. PATENT DOCUMENTS

| | | | |
|---|---|---|---|
| 2011/0234987 A1* | 9/2011 | Tanaka | F21V 29/02 353/52 |
| 2012/0242962 A1* | 9/2012 | Miyata | F21V 29/02 353/52 |
| 2015/0077718 A1* | 3/2015 | Miyata | F21V 29/02 353/52 |
| 2016/0259233 A1* | 9/2016 | Miyata | G03B 21/16 |

* cited by examiner

PROJECTOR AND LIGHT SOURCE MODULE HAVING FLOW GUIDE DEVICE

CROSS-REFERENCE TO RELATED APPLICATION

THIS application CLAIMS THE PRIORITY BENEFIT OF CHINA APPLICATION OF CN201610328044.6 FILED ON 2016 May 17. THE ENTIRETY OF THE ABOVE-MENTIONED patent application IS HEREBY INCORPORATED BY REFERENCE HEREIN AND MADE A PART OF THIS SPECIFICATION.

FIELD OF THE INVENTION

The invention relates to a projector, and more particularly to a projector having a light source module.

BACKGROUND OF THE INVENTION

With the development of technology, the application of projector becomes more and more diverse and the installation of projector is not limited to horizontal installation (i.e., table top or ceiling mount). A projector needs a vertical installation when upward projection or downward projection is required; or, a projector needs a portrait installation (or portrait mode) if beam-up or beam-down is required. For a projector using a high pressure mercury lamp as a light source, in order to maintain a certain lamp life, the projector has different cooling ways for lamp in response to the horizontal installation, vertical installation or portrait installation. Because of the projector has different cooling conditions in response to the horizontal installation, vertical installation or portrait installation, an improper installation may lead to a poor cooling effect if there is a need to switch the projection angle; and consequently, the usage life of the lamp may be significantly reduced. Therefore, to solve the aforementioned problems, it is quite important for the persons in the art to develop a projector for an occasion requiring switching the projection angles frequently.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One object of the invention is to provide a projector. The light source module of the projector has qualified cooling effect in various using states and consequently the usage life of the light source is increased.

Another object of the invention is to provide a light source module having qualified cooling effect in various using states and consequently the usage life of the light source is increased.

Other objects and advantages of the invention can be further illustrated by the technical features broadly embodied and described as follows.

In order to achieve one or a portion of or all of the objects or other objects, the invention provides a projector. The projector includes a light source module, a light valve, and a lens. The light source module includes a light source, a fan, and a flow guide device. The light source has a lamp axis and is adapted to provide an illumination beam. The fan is adapted to provide a cooling airflow. The flow guide device is disposed between the light source and the fan and adapted to guide a flowing direction of the cooling airflow. The flow guide device includes a first air channel, a second air channel, and a first airflow control assembly. The first air channel is connected between a first side of the light source and an air outlet of the fan. The second air channel is connected between a second side of the light source and the air outlet of the fan. The first airflow control assembly is disposed in the first air channel and adapted to control the first air channel either in a communication state or in a non-communication state via an effect of gravity. When the first air channel is in the communication state, the cooling airflow flows from the fan to the light source via the first air channel. The first airflow control assembly has a first control rotating shaft. The first control rotating shaft is inclined relative to the lamp axis and a first included angle is between the first control rotating shaft and the lamp axis. The first included angle is greater than 0 degree and less than 90 degrees. The light valve is disposed on a transmission path of the illumination beam and adapted to convert the illumination beam into an image beam. The lens is disposed on a transmission path of the image beam and adapted to convert the image beam into a projection beam.

In order to achieve one or a portion of or all of the objects or other objects, the invention provides a light source module adapted to be used for a projector. The light source module includes a light source, a fan, and a flow guide device. The light source has a lamp axis. The fan is adapted to provide a cooling airflow. The flow guide device is disposed between the light source and the fan and adapted to guide a flowing direction of the cooling airflow. The flow guide device includes a first air channel, a second air channel, and a first airflow control assembly. The first air channel is connected between a first side of the light source and an air outlet of the fan. The second air channel is connected between a second side of the light source and the air outlet of the fan. The first airflow control assembly is disposed in the first air channel and adapted to control the first air channel either in a communication state or in a non-communication state via an effect of gravity. When the first air channel is in the communication state, the cooling airflow flows from the fan to the light source via the first air channel. The first airflow control assembly has a first control rotating shaft. The first control rotating shaft is inclined relative to the lamp axis and a first included angle is between the first control rotating shaft and the lamp axis. The first included angle is greater than 0 degree and less than 90 degrees.

In summary, the light source module of the projector of the embodiment of the invention includes the first airflow control assembly adapted to control the first air channel either in the communication state or in the non-communication state via an effect of gravity. Through the design of inclining the first control rotating shaft relative to the lamp axis with an included angle greater than 0 degree and less than 90 degrees, it is guaranteed that the cooling airflow provided by the fan may be guided to the light source in various using states. Consequently, the light source module has qualified cooling effect in various using states and the light source has extended usage life when the projector is operated in various using states.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
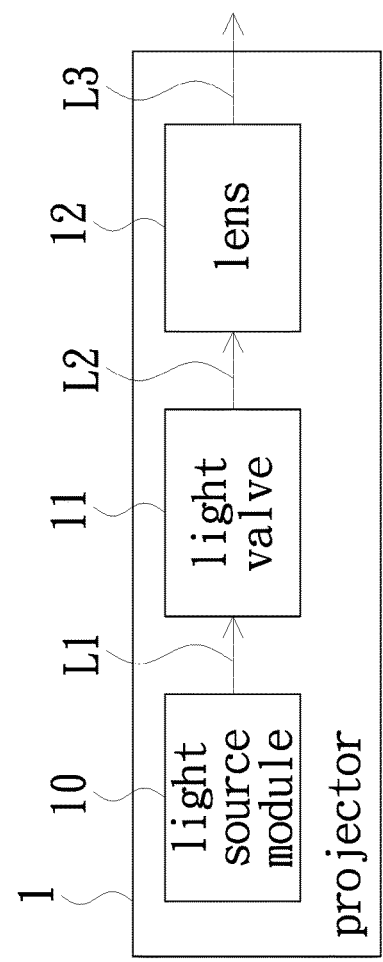
FIG. 1 is a functional block diagram of a projector in accordance with an embodiment of the invention.

FIG. 1 is a functional block diagram of a projector in accordance with an embodiment of the invention. As shown in FIG. 1, the projector 1 of the embodiment includes a light source module 10, a light valve 11, and a lens 12. The light source module 10 is adapted to provide an illumination beam L1. The light valve 11 is disposed on a transmission path of the illumination beam L1 and adapted to convert the illumination beam L1 into an image beam L2. The lens 12 is disposed on a transmission path of the image beam L2 and adapted to convert the image beam L2 into a projection beam L3. In the embodiment, the lens 12 is further adapted to project the projection beam L3 out from the projector 1. In the embodiment, the light valve 11 may be a digital micromirror device (DMD), a liquid crystal on silicon (LCoS) or a liquid crystal display LCD), but the invention is not limited thereto.

Figure 2:
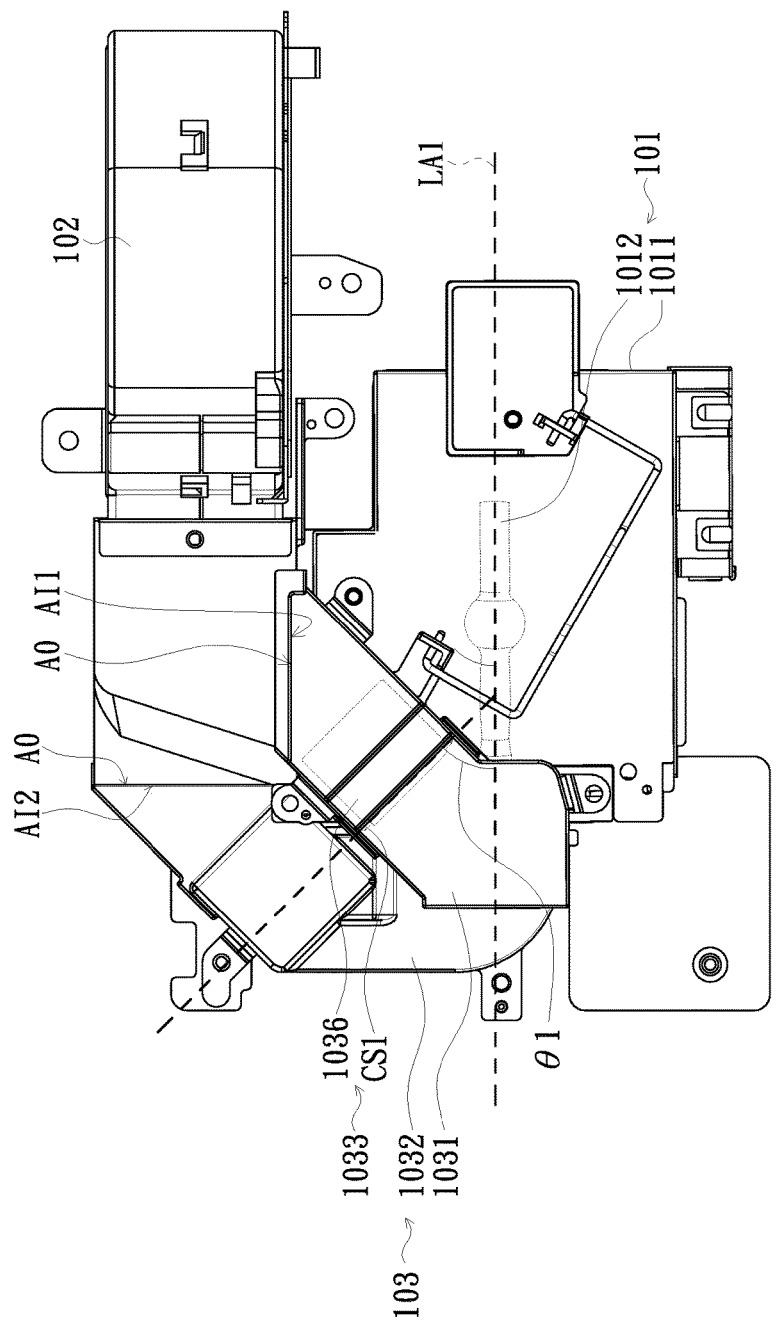
FIG. 2 is a schematic top view of the light source module in FIG. 1 in accordance with an embodiment of the invention.
Figure 3:
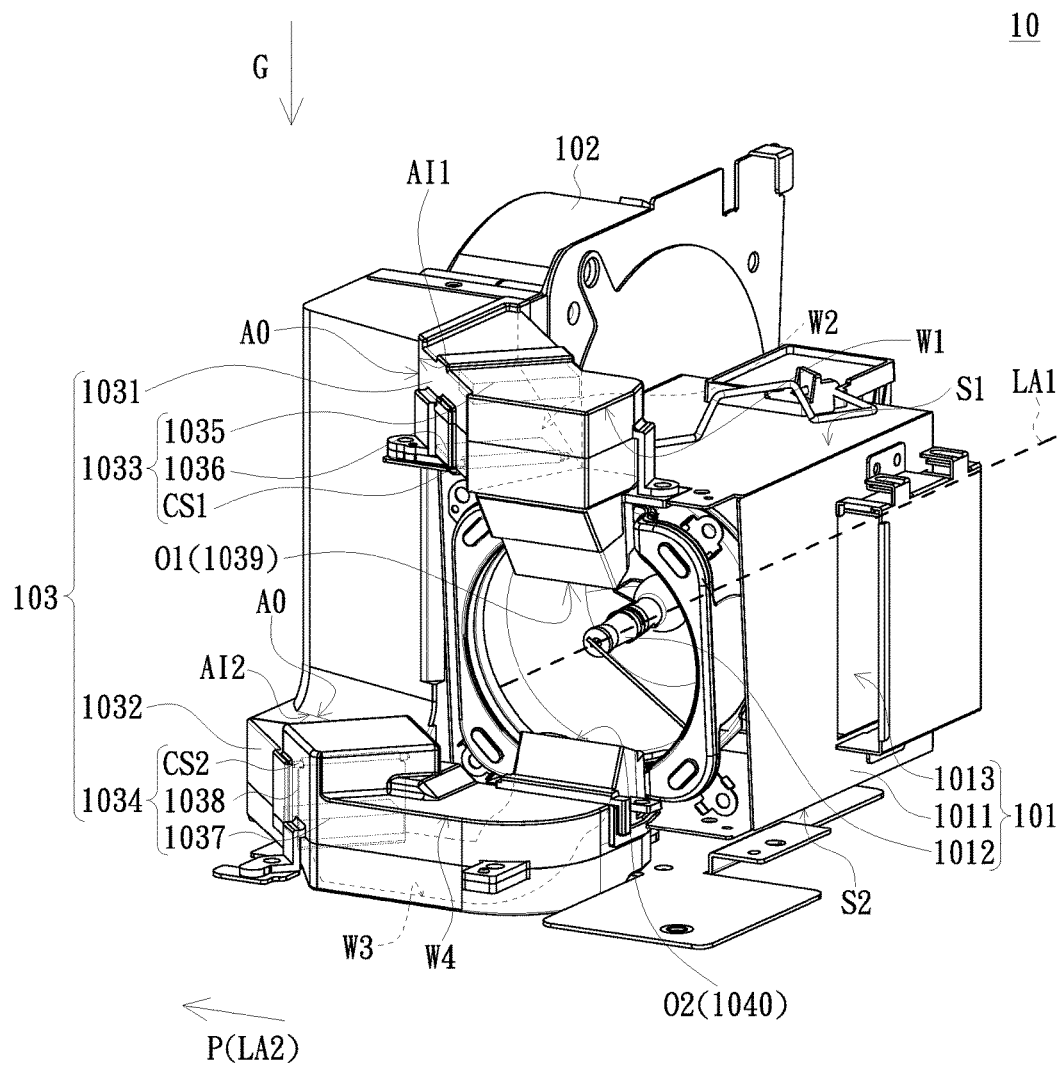
FIG. 3 is a schematic three-dimensional structural view of a light source module in accordance with another embodiment of the invention.

FIG. 2 is a schematic top view of the light source module in FIG. 1 in accordance with an embodiment of the invention. FIG. 3 is a schematic three-dimensional structural view of a light source module in accordance with another embodiment of the invention. As shown in FIGS. 1 and 2, the light source module 10 of the embodiment includes a light source 101, a fan 102, and a flow guide device 103. The light source 101 has a lamp axis LA1 and is adapted to provide the illumination beam L1. The fan 102 is adapted to provide a cooling airflow. The flow guide device 103 is disposed between the light source 101 and the fan 102. The flow guide device 103 of the embodiment is adapted to guide the flowing direction of the cooling airflow provided by the fan 102. In the embodiment, the flow guide device 103 includes a first air channel 1031, a second air channel 1032, and a first airflow control assembly 1033. In the embodiment, the first air channel 1031 is connected between a first side S1 of the light source 101 and an air outlet A0 of the fan 102; and the second air channel 1032 is connected between a second side S2 of the light source 101 and the air outlet A0 of the fan 102. Specifically, in the embodiment, an air inlet AI1 of the first air channel 1031 and an air inlet AI2 of the second air channel 1032 together are connected to the air outlet A0 of the fan 102. The first airflow control assembly 1033 is disposed in the first air channel 1031 and adapted to control the first air channel 1031 either in a communication state or in a non-communication state via the utility of gravity. In the embodiment, when the first air channel 1031 is in the communication state, the first airflow control assembly 1033 does not block the cooling airflow so that the cooling airflow may flow from the fan 102 to the light source 101 via the first air channel 1031. The first airflow control assembly 1033 includes a first control rotating shaft CS1. The first control rotating shaft CS1 is inclined relative to the lamp axis LA1, and a first included angle θ1 between the first control rotating shaft CS1 and the lamp axis LA1 is greater than 0 degree and less than 90 degrees.

In one embodiment as shown in FIG. 3, a projection direction P of the projection beam L3 provided by the lens 12 in FIG. 1 is an extending direction of a light axis LA2, but the invention is not limited thereto. In addition, in one embodiment, the lamp axis LA1 of the light source 101 is, for example, perpendicular to the light axis LA2 of the lens 12, but the invention is not limited thereto. As shown in FIG. 3, the flow guide device 103 of the embodiment further includes a second airflow control assembly 1034. In the embodiment, the second airflow control assembly 1034 is disposed in the second air channel 1032 and adapted to control the second air channel 1032 either in the communication state or in the non-communication state via the utility of gravity. In the embodiment, when the second air channel 1032 is in the non-communication state, the second airflow control assembly 1034 blocks the cooling airflow to flow from the fan 102 to the light source 101; wherein meanwhile the first air channel 1031 is in the communication state. Namely, at this time the cooling airflow flows from the fan 102 to the light source 101 via the first air channel 1031 rather than via the second air channel 1032. In the embodiment, the first air channel 1031 is in the non-communication state while the second air channel 1032 is in the communication state; that is, at this time the cooling airflow flows from the fan 102 to the light source 101 via the second air channel 1032 rather than via the first air channel 1031. In the embodiment, the second airflow control assembly 1034 includes a second control rotating shaft CS2. In the embodiment, the second control rotating shaft CS2 is inclined relative to the lamp axis LA1, and a second included angle θ2 between the second control rotating shaft CS2 and the lamp axis LA1 is greater than 0 degree and less than 90 degrees. In one embodiment, the first control rotating shaft CS1 and the second control rotating shaft CS2 are pivoting mechanism assemblies known to a person of ordinary skill in the art, and the invention is not limited thereto.

In the embodiment, both of the first included angle θ1 and the second included angle θ2 are 45 degrees, but the invention is not limited thereto. That is, in the embodiment, the first included angle θ1 and the second included angle θ2 may be selected within a range from greater than 0 degree to less than 90 degrees according to the actual requirements.

In other embodiments, the first control rotating shaft CS1 and the second control rotating shaft CS2 may be driven to rotate via other means such as utilizing a driving motor to drive a gear assembly, thereby assisting the rotations of the first control rotating shaft CS1 and the second control rotating shaft CS2 and consequentially rendering the first air channel 1031 and the second air channel 1032 either in the communication state or in the non-communication state accurately, but the invention is not limited thereto. In addition, the flow guide device 103 including two air channels (i.e., the first air channel 1031 and the second air channel 1032) is an exemplary embodiment of the invention, and the invention is not limited thereto. Namely, in other embodiments, the number/quantity of the air channels disposed in the flow guide device 103 may be adjusted to three or more than three according to the actual requirements.

As shown in FIG. 3, the first airflow control assembly 1033 of the embodiment includes a first baffle member 1035 and a first baffle plate 1036. In the embodiment, the first baffle member 1035 is a block, but the invention is not limited thereto; that is, the form or structure of the first baffle member 1035 may have various designs according to the actual requirements. In the embodiment, the first baffle member 1035 is fixedly disposed on a first inner wall W1 of the first air channel 1031. The first baffle plate 1036 is adapted to lean against the first baffle member 1035 and pivotally connected to the first control rotating shaft CS1. Specifically, in the embodiment, the first control rotating shaft CS1 is disposed on a second inner wall W2 of the first air channel 1031, wherein the second inner wall W2 and the first inner wall W1 are opposite to each other; the second inner wall W2 is relatively adjacent to the light source 101; the first inner wall W1 is relatively away from the light source 101; and the second inner wall W2 is disposed between the first inner wall W1 and the light source 101. Therefore, by utilizing the aforementioned structural design, the first baffle plate 1036 may rotate in response to the projector 1 in different operating states and thereby switching the first air channel 1031 between the communication state and the non-communication state. Namely, in the embodiment, the first air channel 1031 is in the non-communication state when the first baffle plate 1036 leans against the first baffle member 1035 by the effect of gravity; alternatively, the first air channel 1031 is in the communication state when the first baffle plate 1036 does not lean against the first baffle member 1035 by the effect of gravity.

As shown in FIG. 3, the second airflow control assembly 1034 of the embodiment includes a second baffle member 1037 and a second baffle plate 1038. In the embodiment, the second baffle member 1037 is a block, but the invention is not limited thereto; that is, the form or structure of the second baffle member 1037 may have various designs according to the actual requirements. In the embodiment, the second baffle member 1037 is fixedly disposed on a third inner wall W3 of the second air channel 1032. The second baffle plate 1038 is adapted to lean against the second baffle member 1037 and pivotally connected to the second control rotating shaft CS2. Specifically, in the embodiment, the second control rotating shaft CS2 is disposed on a fourth inner wall W4 of the second air channel 1032, wherein the fourth inner wall W4 and the third inner wall W3 are opposite to each other; the fourth inner wall W4 is relatively adjacent to the light source 101; the third inner wall W3 is relatively away from the light source 101; and the fourth inner wall W4 is disposed between the third inner wall W3 and the light source 101. Therefore, by utilizing the aforementioned structural design, the second baffle plate 1038 may rotate in response to the projector 1 in different operating states and thereby switching the second air channel 1032 between the communication state and the non-communication state. Namely, in the embodiment, the second air channel 1032 is in the non-communication state when the second baffle plate 1038 leans against the second baffle member 1037 by the effect of gravity; alternatively, the second air channel 1032 is in the communication state when the second baffle plate 1038 does not lean against the second baffle member 1037 by the effect of gravity.

As shown in FIG. 3, the flow guide device 103 of the embodiment further includes a first flow guide unit 1039 and a second flow guide unit 1040. In the embodiment, the first flow guide unit 1039 is disposed between the first air channel 1031 and the light source 101. The first flow guide unit 1039 has a first outlet O1 facing the light source 101. In the embodiment, the second flow guide unit 1040 is disposed between the second air channel 1032 and the light source 101. The second flow guide unit 1040 has a second outlet O2 facing the light source 101. Specifically, in the embodiment, the first flow guide unit 1039 communicates with the first air channel 1031 and the second flow guide unit 1040 communicates with the second air channel 1032. In the embodiment, the effectiveness of the first flow guide unit 1039 is to guide the cooling airflow flowing through the first air channel 1031 to the light source 101 via the first outlet O1. In the embodiment, the effectiveness of the second flow guide unit 1040 is to guide the cooling airflow flowing through the second air channel 1032 to the light source 101 via the second outlet O2.

In one embodiment, the first outlet O1 of the first flow guide unit 1039 and the second outlet O2 of the second flow guide unit 1040 are disposed to face to each other relative to a light emitting element 1012 of the light source 101, thereby be capable of reducing the temperature at an upper portion of the light emitting element 1012 (base on referring the direction of gravity as a reference direction) more effectively, but the invention is not limited thereto.

In one embodiment, the first outlet O1 of the first flow guide unit 1039 may be disposed with a movable member capable of increasing the flow-guide effect and the second outlet O2 of the second flow guide unit 1040 may be disposed with another movable member capable of increasing the flow-guide effect, but the invention is not limited thereto. Namely, the movable members may be disposed in accordance with the needs of the actual situation.

As shown in FIG. 3, the light source 101 of the embodiment includes a housing 1011 and the light emitting element 1012 disposed in the housing 1011. In the embodiment, the housing 1011 has at least one opening 1013. In the embodiment, the cooling airflow provided by the fan 102 is guided to the light emitting element 1012 in the housing 1011 by the flow guide device 103 and flows out from the housing 1011 via the at least one opening 1013. In addition, in the embodiment, the first air channel 1031 is connected between the first side S1 of the light source 101 and the air outlet A0 of the fan 102, the second air channel 1032 is connected between the second side S2 of the light source 101 and the air outlet A0 of the fan 102, wherein the first side S1 and the second side S2 are the two opposite sides of the housing 1011, but the invention is not limited thereto.

How the cooling airflow provided by the fan 102 is guided by the flow guide device 103 when the projector 1 is operated in different states will be described in detail as follow.

Figure 4:
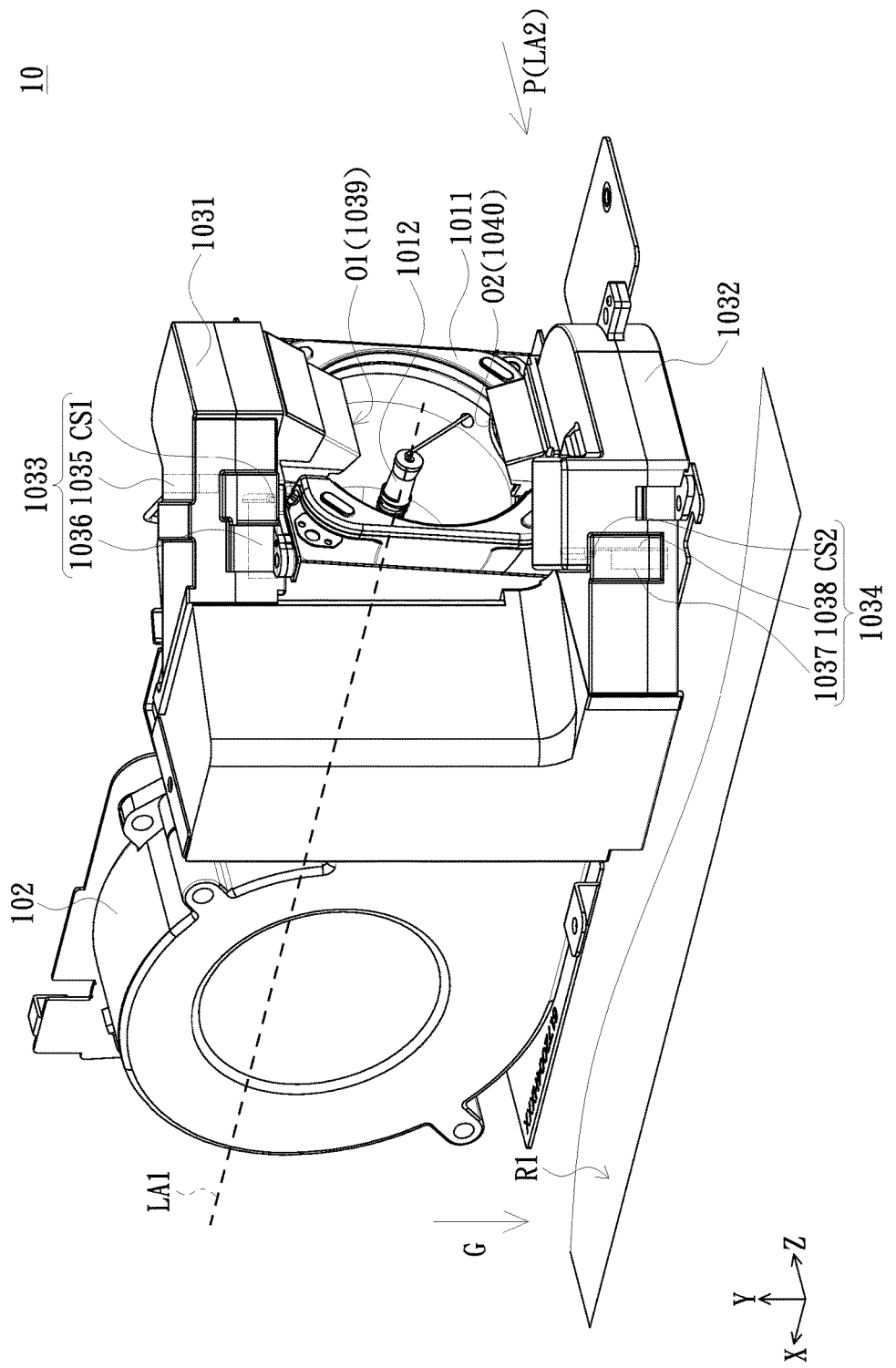
FIG. 4 is a schematic three-dimensional structural diagram of the light source module shown in FIG. 3 in a using state in accordance with an embodiment of the invention.

Please refer to FIG. 4, which is a schematic three-dimensional structural diagram of the light source module shown in FIG. 3 in a using state in accordance with an embodiment of the invention. In the embodiment, when the projector 1 is fixed to, for example, a reference plane R1 of a desktop, the second air channel 1032 of the flow guide device 103 is located between the reference plane R1 and the lamp axis LA1 of the light source 101, and the lamp axis LA1 of the light source 101 is parallel to the reference plane R1. Specifically, in the embodiment, the second air channel 1032 is located between the reference plane R1 and the first air channel 1031; the extending directions of the first air channel 1031 and the second air channel 1032 are substantially parallel to the reference plane R1; and the projection direction P (i.e., the light axis LA2) of the projection beam L3 provided by the lens 12 in FIG. 1 is perpendicular to the direction of gravity G. In the using state of the embodiment, the second baffle plate 1038 of the second airflow control assembly 1034 rotates in a direction toward the second baffle member 1037 by the effect of gravity and the second control rotating shaft CS2 until the second baffle plate 1038 leans against the second baffle member 1037, so as to render the second air channel 1032 in the non-communication state. Meanwhile, the first baffle plate 1036 of the first airflow control assembly 1033 rotates in a direction away from the first baffle member 1035 by the effect of gravity and the first control rotating shaft CS1, so as to make the first baffle plate 1036 not lean against the first baffle member 1035 and render the first air channel 1031 in the communication state. As a result, the cooling airflow provided by the fan 102 may flow to and cool the light emitting element 1012 of the light source 101 via the first air channel 1031.

However, in one embodiment, the second airflow control assembly 1034 in FIG. 4 may not include the second baffle member 1037 (i.e., the second airflow control assembly 1034 includes only the second baffle plate 1038 and the second control rotating shaft CS2). Specifically, the second baffle plate 1038 of the second airflow control assembly 1034 rotates by the effect of gravity and the second control rotating shaft CS2 so as to block the cooling airflow and render the second air channel 1032 in the non-communication state, but the invention is not limited thereto. Or, in another embodiment, the first airflow control assembly 1033 in FIG. 4 may not include the first baffle member 1035 (i.e., the first airflow control assembly 1033 includes only the first baffle plate 1036 and the first control rotating shaft CS1). Specifically, the first baffle plate 1036 of the first airflow control assembly 1033 rotates by the effect of gravity and the first control rotating shaft CS1 so as to render the first air channel 1031 in the communication state, but the invention is not limited thereto. Or, in still another embodiment, the first airflow control assembly 1033 in FIG. 4 may not include the first baffle member 1035 and the second airflow control assembly 1034 in FIG. 4 may not include the second baffle member 1037 (i.e., the first airflow control assembly 1033 includes only the first baffle plate 1036 and the first control rotating shaft CS1 and the second airflow control assembly 1034 includes only the second baffle plate 1038 and the second control rotating shaft CS2). Specifically, the first baffle plate 1036 of the first airflow control assembly 1033 rotates by the effect of gravity and the first control rotating shaft CS1 so as to render the first air channel 1031 in the communication state and the second baffle plate 1038 of the second airflow control assembly 1034 rotates by the effect of gravity and the second control rotating shaft CS2 so as to block the cooling airflow and render the second air channel 1032 in the non-communication state, but the invention is not limited thereto.

According to the above description, it is shown that the effect of cooling the hot spot of the light source module 10 may be achieved by rendering the second air channel 1032 in the non-communication state and guiding the cooling airflow to the above of the light emitting element 1012 of the light source 101 in FIG. 4 via the first air channel 1031 in the communication state. Therefore, the light emitting element 1012 may be prevented from having an uneven heat distribution and consequently the light emitting element 1012 of the light source 101 of the light source module 10 has extended usage life. In the embodiment as shown in FIG. 4, the hot spot is, for example, located at the upper portion of the light emitting element 1012; and more specifically, the heat is, for example, accumulated at the upper portion of the light emitting element 1012 with respect to the direction of gravity.

Figure 5:
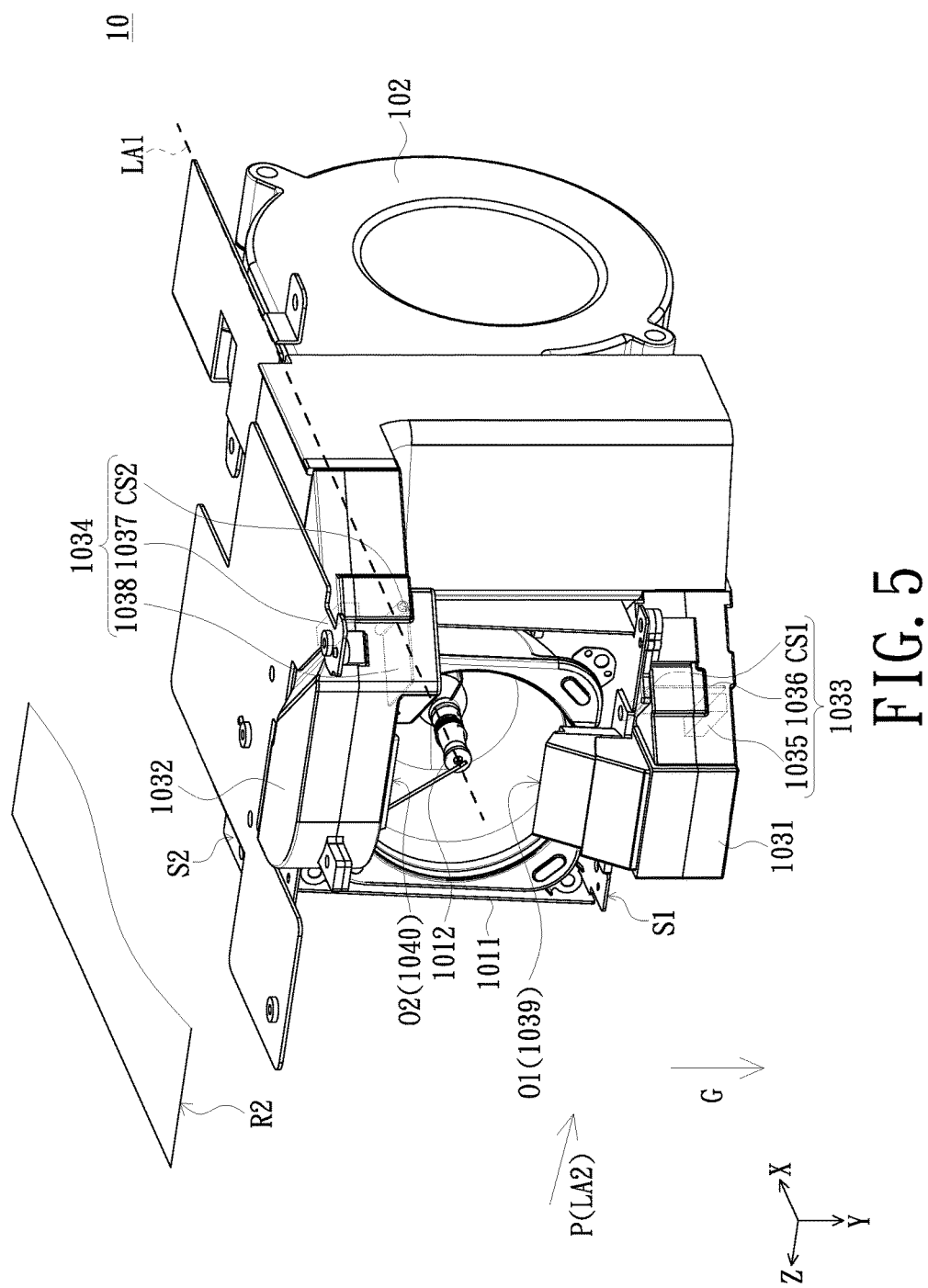
FIG. 5 is a schematic three-dimensional structural diagram of the light source module shown in FIG. 3 in another using state in accordance with an embodiment of the invention.

Please refer to FIG. 5, which is a schematic three-dimensional structural diagram of the light source module shown in FIG. 3 in another using state in accordance with an embodiment of the invention. In the embodiment, when the projector 1 is fixed to, for example, a reference plane R2 of a ceiling, the second air channel 1032 of the flow guide device 103 is located between the reference plane R2 and the lamp axis LA1 of the light source 101, and the lamp axis LA1 of the light source 101 is parallel to the reference plane R2. Specifically, in the embodiment, the second air channel 1032 is located between the reference plane R2 and the first air channel 1031; the extending directions of the first air channel 1031 and the second air channel 1032 are substantially parallel to the reference plane R2; and the projection direction P (i.e., the light axis LA2) of the projection beam L3 provided by the lens 12 in FIG. 1 is perpendicular to the direction of gravity G. In the using state of the embodiment, the first baffle plate 1036 of the first airflow control assembly 1033 rotates in a direction toward the first baffle member 1035 by the effect of gravity and the first control rotating shaft CS1 until the first baffle plate 1036 leans against the first baffle member 1035, so as to render the first air channel 1031 in the non-communication state. Meanwhile, the second baffle plate 1038 of the second airflow control assembly 1034 rotates in a direction away from the second baffle member 1037 by the effect of gravity and the second control rotating shaft CS2, so as to make the second baffle plate 1038 not lean against the second baffle member 1037 and render the second air channel 1032 in the communication state. As a result, the cooling airflow provided by the fan 102 may flow to and cool the light emitting element 1012 of the light source 101 via the second air channel 1032.

However, in one embodiment, the first airflow control assembly 1033 in FIG. 5 may not include the first baffle member 1035 (i.e., the first airflow control assembly 1033 includes only the first baffle plate 1036 and the first control rotating shaft CS1). Specifically, the first baffle plate 1036 of the first airflow control assembly 1033 rotates by the effect of gravity and the first control rotating shaft CS1 so as to block the cooling airflow and render the first air channel 1031 in the non-communication state, but the invention is not limited thereto. Or, in another embodiment, the second airflow control assembly 1034 in FIG. 5 may not include the second baffle member 1037 (i.e., the second airflow control assembly 1034 includes only the second baffle plate 1038 and the second control rotating shaft CS2). Specifically, the second baffle plate 1038 of the second airflow control assembly 1034 rotates by the effect of gravity and the second control rotating shaft CS2 so as to render the second air channel 1032 in the communication state, but the invention is not limited thereto. Or, in still another embodiment, the first airflow control assembly 1033 in FIG. 5 may not include the first baffle member 1035 and the second airflow control assembly 1034 in FIG. 5 may not include the second baffle member 1037 (i.e., the first airflow control assembly 1033 includes only the first baffle plate 1036 and the first control rotating shaft CS1 and the second airflow control assembly 1034 includes only the second baffle plate 1038 and the second control rotating shaft CS2). Specifically, the first baffle plate 1036 of the first airflow control assembly 1033 rotates by the effect of gravity and the first control rotating shaft CS1 so as to block the cooling airflow and render the first air channel 1031 in the non-communication state and the second baffle plate 1038 of the second airflow control assembly 1034 rotates by the effect of gravity and the second control rotating shaft CS2 so as to render the second air channel 1032 in the communication state, but the invention is not limited thereto.

According to the above description, it is shown that the effect of cooling the hot spot of the light source module 10 may be achieved by rendering the first air channel 1031 in the non-communication state and guiding the cooling airflow to the above of the light emitting element 1012 of the light source 101 in FIG. 5 via the second air channel 1032 in the communication state. Therefore, the light emitting element 1012 may be prevented from having an uneven heat distribution and consequently the light emitting element 1012 of the light source 101 of the light source module 10 has extended usage life. In the embodiment as shown in FIG. 5, the hot spot is, for example, located at the upper portion of the light emitting element 1012; and more specifically, the heat is, for example, accumulated at the upper portion of the light emitting element 1012 with respect to the direction of gravity.

Figure 6:
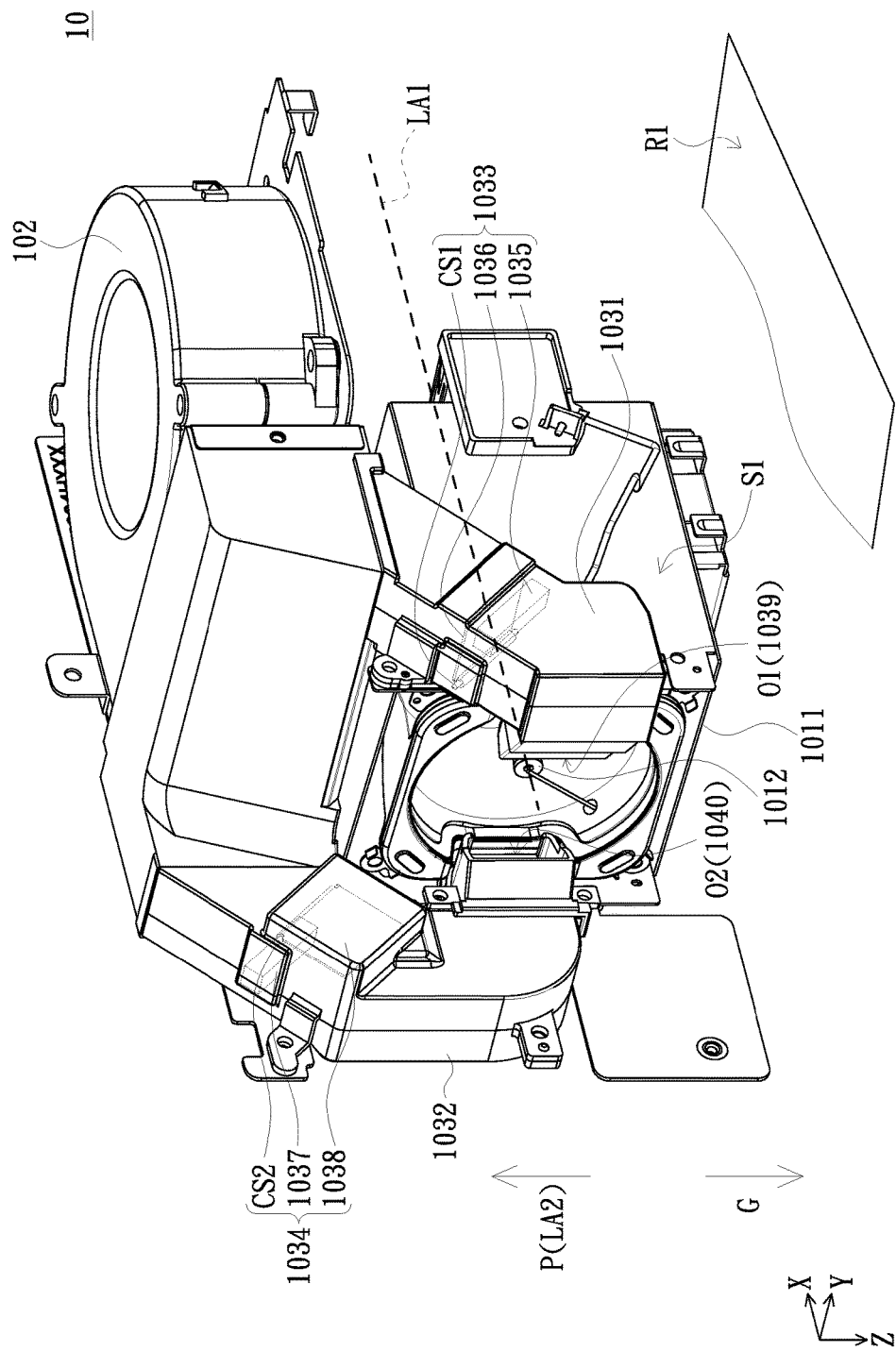
FIG. 6 is a schematic three-dimensional structural diagram of the light source module shown in FIG. 3 in another using state in accordance with an embodiment of the invention.

Please refer to FIG. 6, which is a schematic three-dimensional structural diagram of the light source module shown in FIG. 3 in another using state in accordance with an embodiment of the invention. In the embodiment, when the projector 1 is fixed to, for example, the reference plane R1 of the desktop, the first air channel 1031 and the second air channel 1032 are located above the reference plane R1; a portion of the first air channel 1031 is located between the reference plane R1 and a portion of the second air channel 1032; a portion of the second air channel 1032 is located between the reference plane R1 and a portion of the first air channel 1031; and the lamp axis LA1 of the light source 101 is parallel to the reference plane R1. Specifically, in the embodiment, the extending directions of the first air channel 1031 and the second air channel 1032 are not parallel to the reference plane R1; and the projection direction P (i.e., the light axis LA2) of the projection beam L3 provided by the lens 12 in FIG. 1 is parallel to the direction of gravity G. In the using state of the embodiment, the first baffle plate 1036 of the first airflow control assembly 1033 rotates in a direction toward the first baffle member 1035 by the effect of gravity and the first control rotating shaft CS1 until the first baffle plate 1036 leans against the first baffle member 1035, so as to render the first air channel 1031 in the non-communication state. Meanwhile, the second baffle plate 1038 of the second airflow control assembly 1034 rotates in a direction away from the second baffle member 1037 by the effect of gravity and the second control rotating shaft CS2, so as to make the second baffle plate 1038 not lean against the second baffle member 1037 and render the second air channel 1032 in the communication state. As a result, the cooling airflow provided by the fan 102 may flow to and cool the light emitting element 1012 of the light source 101 via the second air channel 1032.

However, in one embodiment, the second airflow control assembly 1034 in FIG. 6 may not include the second baffle member 1037 (i.e., the second airflow control assembly 1034 includes only the second baffle plate 1038 and the second control rotating shaft CS2). Specifically, the second baffle plate 1038 of the second airflow control assembly 1034 rotates by the effect of gravity and the second control rotating shaft CS2 so as to render the second air channel 1032 in the communication state, but the invention is not limited thereto.

According to the above description, it is shown that the effect of cooling the hot spot of the light source module 10 may be achieved by rendering the first air channel 1031 in the non-communication state and guiding the cooling airflow to the left of the light emitting element 1012 of the light source 101 in FIG. 6 via the second air channel 1032 in the communication state. Therefore, the light emitting element 1012 may be prevented from having an uneven heat distribution and consequently the light emitting element 1012 of the light source 101 of the light source module 10 has extended usage life. In the embodiment as shown in FIG. 6, the hot spot is, for example, located on the left of the light emitting element 1012; and more specifically, the heat is, for example, accumulated on the left of the light emitting element 1012.

In another embodiment, the first airflow control assembly 1033 in FIG. 6 may not include the first baffle member 1035 and the second airflow control assembly 1034 in FIG. 6 may not include the second baffle member 1037 (i.e., the first airflow control assembly 1033 includes only the first baffle plate 1036 and the first control rotating shaft CS1 and the second airflow control assembly 1034 includes only the second baffle plate 1038 and the second control rotating shaft CS2). Specifically, the first baffle plate 1036 of the first airflow control assembly 1033 rotates by the effect of gravity and the first control rotating shaft CS1 so as to render the first air channel 1031 in the communication state and the second baffle plate 1038 of the second airflow control assembly 1034 rotates by the effect of gravity and the second control rotating shaft CS2 so as to also render the second air channel 1032 in the communication state, but the invention is not limited thereto.

Figure 7:
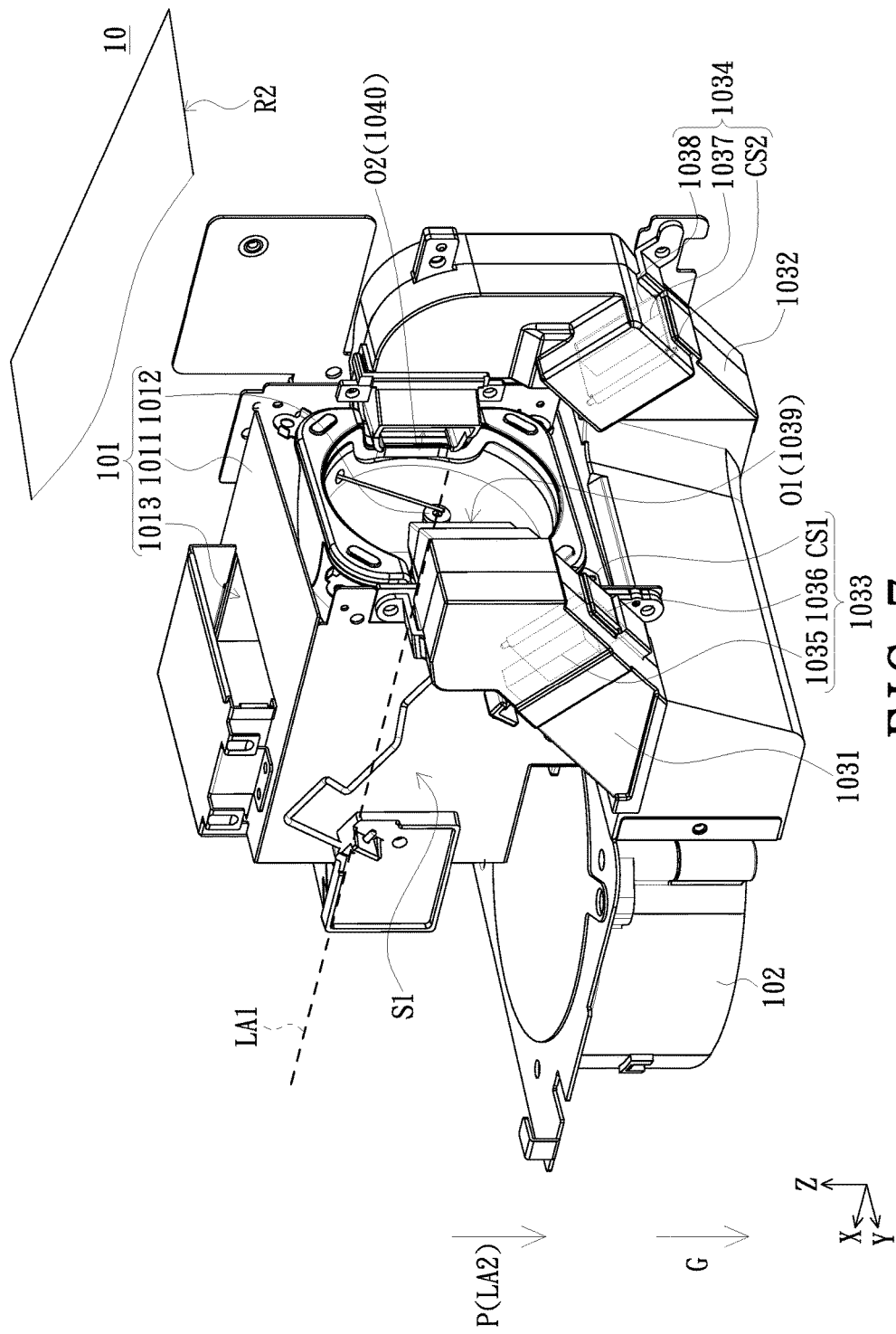
FIG. 7 is a schematic three-dimensional structural diagram of the light source module shown in FIG. 3 in another using state in accordance with an embodiment of the invention.

Please refer to FIG. 7, which is a schematic three-dimensional structural diagram of the light source module shown in FIG. 3 in another using state in accordance with an embodiment of the invention. In the embodiment, when the projector 1 is fixed to, for example, the reference plane R2 of the ceiling, the first air channel 1031 and the second air channel 1032 are located under the reference plane R2; a portion of the first air channel 1031 is located between the reference plane R2 and a portion of the second air channel 1032; a portion of the second air channel 1032 is located between the reference plane R2 and a portion of the first air channel 1031; and the lamp axis LA1 of the light source 101 is parallel to the reference plane R2. Specifically, in the embodiment, the extending directions of the first air channel 1031 and the second air channel 1032 are not parallel to the reference plane R2; and the projection direction P (i.e., the light axis LA2) of the projection beam L3 provided by the lens 12 in FIG. 1 is parallel to the direction of gravity G. In the using state of the embodiment, the second baffle plate 1038 of the second airflow control assembly 1034 rotates in a direction toward the second baffle member 1037 by the effect of gravity and the second control rotating shaft CS2 until the second baffle plate 1038 leans against the second baffle member 1037, so as to render the second air channel 1032 in the non-communication state. Meanwhile, the first baffle plate 1036 of the first airflow control assembly 1033 rotates in a direction away from the first baffle member 1035 by the effect of gravity and the first control rotating shaft CS1, so as to make the first baffle plate 1036 not lean against the first baffle member 1035 and render the first air channel 1031 in the communication state. As a result, the cooling airflow provided by the fan 102 may flow to and cool the light emitting element 1012 of the light source 101 via the first air channel 1031.

However, in one embodiment, the first airflow control assembly 1033 in FIG. 7 may not include the first baffle member 1035 (i.e., the first airflow control assembly 1033 includes only the first baffle plate 1036 and the first control rotating shaft CS1). Specifically, the first baffle plate 1036 of the first airflow control assembly 1033 rotates by the effect of gravity and the first control rotating shaft CS1 so as to render the first air channel 1031 in the communication state, but the invention is not limited thereto.

According to the above description, it is shown that the effect of cooling the hot spot of the light source module 10 may be achieved by rendering the second air channel 1032 in the non-communication state and guiding the cooling airflow to the left of the light emitting element 1012 of the light source 101 in FIG. 7 via the first air channel 1031 in the communication state. Therefore, the light emitting element 1012 may be prevented from having an uneven heat distribution and consequently the light emitting element 1012 of the light source 101 of the light source module 10 has extended usage life. In the embodiment as shown in FIG. 7, the hot spot is, for example, located on the left of the light emitting element 1012; and more specifically, the heat is, for example, accumulated on the left of the light emitting element 1012.

In another embodiment, the first airflow control assembly 1033 in FIG. 7 may not include the first baffle member 1035 and the second airflow control assembly 1034 in FIG. 7 may not include the second baffle member 1037 (i.e., the first airflow control assembly 1033 includes only the first baffle plate 1036 and the first control rotating shaft CS1 and the second airflow control assembly 1034 includes only the second baffle plate 1038 and the second control rotating shaft CS2). Specifically, the first baffle plate 1036 of the first airflow control assembly 1033 rotates by the effect of gravity and the first control rotating shaft CS1 so as to render the first air channel 1031 in the communication state and the second baffle plate 1038 of the second airflow control assembly 1034 rotates by the effect of gravity and the second control rotating shaft CS2 so as to also render the second air channel 1032 in the communication state, but the invention is not limited thereto.

Figure 8:
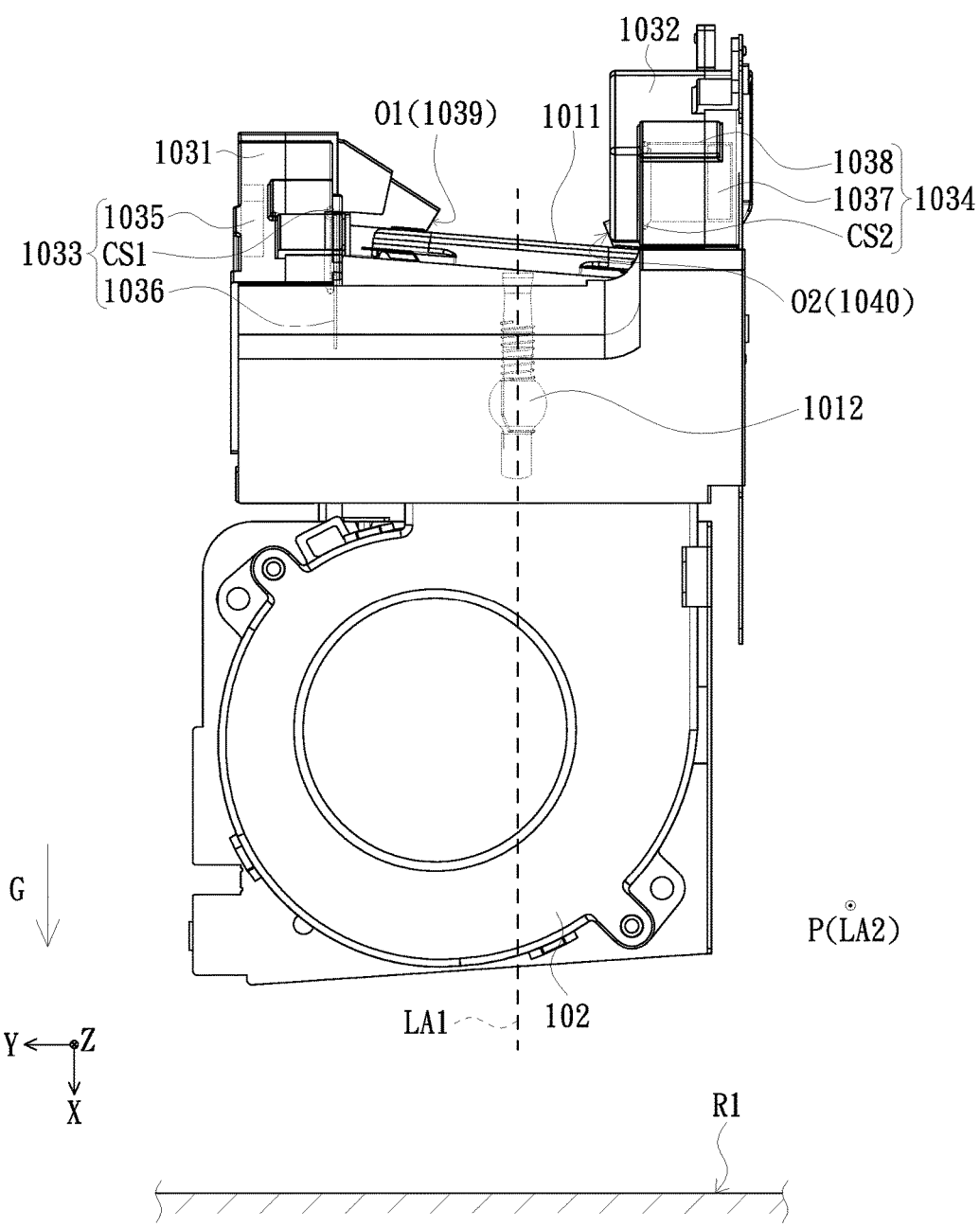
FIG. 8 is a schematic three-dimensional structural diagram of the light source module shown in FIG. 3 in another using state in accordance with an embodiment of the invention.

Please refer to FIG. 8, which is a schematic three-dimensional structural diagram of the light source module shown in FIG. 3 in another using state in accordance with an embodiment of the invention. In the embodiment, when the projector 1 is fixed to, for example, the reference plane R1 of the desktop, the lamp axis LA1 of the light source 101 is perpendicular to the reference plane R1. Specifically, in the embodiment, the extending directions of the first air channel 1031 and the second air channel 1032 are not parallel to the reference plane R1; and the projection direction P (i.e., the light axis LA2) of the projection beam L3 provided by the lens 12 in FIG. 1 is perpendicular to the direction of gravity G. In the using state of the embodiment, the second baffle plate 1038 of the second airflow control assembly 1034 rotates in a direction toward the second baffle member 1037 by the effect of gravity and the second control rotating shaft CS2 until the second baffle plate 1038 leans against the second baffle member 1037, so as to render the second air channel 1032 in the non-communication state. Meanwhile, the first baffle plate 1036 of the first airflow control assembly 1033 rotates in a direction away from the first baffle member 1035 by the effect of gravity and the first control rotating shaft CS1, so as to make the first baffle plate 1036 not lean against the first baffle member 1035 and render the first air channel 1031 in the communication state. As a result, the cooling airflow provided by the fan 102 may flow to and cool the light emitting element 1012 of the light source 101 via the first air channel 1031.

However, in one embodiment, the first airflow control assembly 1033 in FIG. 8 may not include the first baffle member 1035 (i.e., the first airflow control assembly 1033 includes only the first baffle plate 1036 and the first control rotating shaft CS1). Specifically, the first baffle plate 1036 of the first airflow control assembly 1033 rotates by the effect of gravity and the first control rotating shaft CS1 so as to render the first air channel 1031 in the communication state, but the invention is not limited thereto.

According to the above description, it is shown that the effect of cooling the hot spot of the light source module 10 may be achieved by rendering the second air channel 1032 in the non-communication state and guiding the cooling airflow to the left of the light emitting element 1012 of the light source 101 in FIG. 8 via the first air channel 1031 in the communication state. Therefore, the light emitting element 1012 may be prevented from having an uneven heat distribution and consequently the light emitting element 1012 of the light source 101 of the light source module 10 has extended usage life. In the embodiment as shown in FIG. 8, the hot spot is, for example, located on the left of the light emitting element 1012; and more specifically, the heat is, for example, accumulated on the left of the light emitting element 1012.

In another embodiment, the first airflow control assembly 1033 in FIG. 8 may not include the first baffle member 1035 and the second airflow control assembly 1034 in FIG. 8 may not include the second baffle member 1037 (i.e., the first airflow control assembly 1033 includes only the first baffle plate 1036 and the first control rotating shaft CS1 and the second airflow control assembly 1034 includes only the second baffle plate 1038 and the second control rotating shaft CS2). Specifically, the first baffle plate 1036 of the first airflow control assembly 1033 rotates by the effect of gravity and the first control rotating shaft CS1 so as to render the first air channel 1031 in the communication state and the second baffle plate 1038 of the second airflow control assembly 1034 rotates by the effect of gravity and the second control rotating shaft CS2 so as to also render the second air channel 1032 in the communication state, but the invention is not limited thereto.

Figure 9:
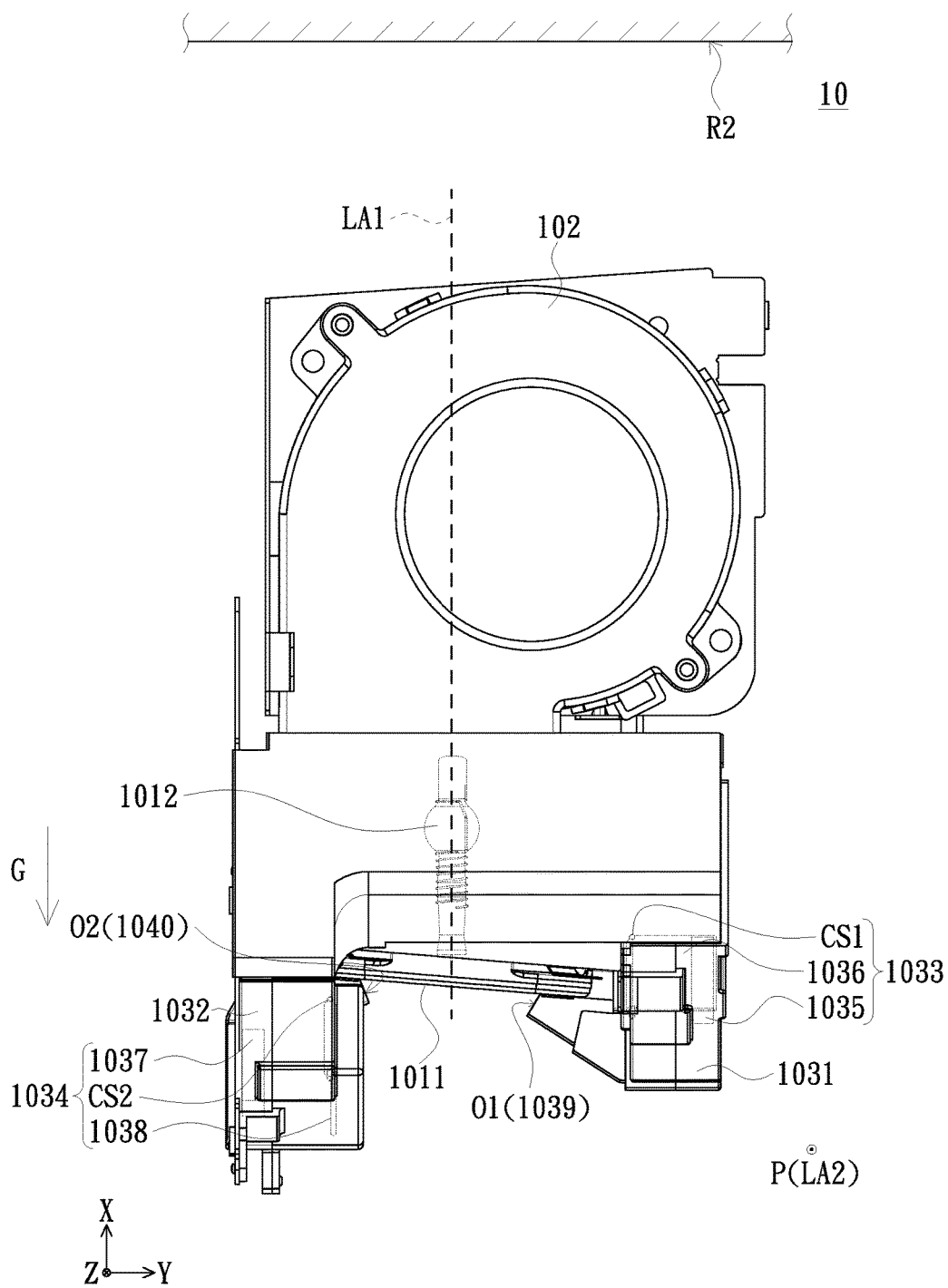
FIG. 9 is a schematic three-dimensional structural diagram of the light source module shown in FIG. 3 in another using state in accordance with an embodiment of the invention.

Please refer to FIG. 9, which is a schematic three-dimensional structural diagram of the light source module shown in FIG. 3 in another using state in accordance with an embodiment of the invention. In the embodiment, when the projector 1 is fixed to, for example, the reference plane R2 of the ceiling, the lamp axis LA1 of the light source 101 is perpendicular to the reference plane R2. Specifically, in the embodiment, the extending directions of the first air channel 1031 and the second air channel 1032 are not parallel to the reference plane R2; and the projection direction P (i.e., the light axis LA2) of the projection beam L3 provided by the lens 12 in FIG. 1 is perpendicular to the direction of gravity G. In the using state of the embodiment, the first baffle plate 1036 of the first airflow control assembly 1033 rotates in a direction toward the first baffle member 1035 by the effect of gravity and the first control rotating shaft CS1 until the first baffle plate 1036 leans against the first baffle member 1035, so as to render the first air channel 1031 in the non-communication state. Meanwhile, the second baffle plate 1038 of the second airflow control assembly 1034 rotates in a direction away from the second baffle member 1037 by the effect of gravity and the second control rotating shaft CS2, so as to make the second baffle plate 1038 not lean against the second baffle member 1037 and render the second air channel 1032 in the communication state. As a result, the cooling airflow provided by the fan 102 may flow to and cool the light emitting element 1012 of the light source 101 via the second air channel 1032.

However, in one embodiment, the second airflow control assembly 1034 in FIG. 9 may not include the second baffle member 1037 (i.e., the second airflow control assembly 1034 includes only the second baffle plate 1038 and the second control rotating shaft CS2). Specifically, the second baffle plate 1038 of the second airflow control assembly 1034 rotates by the effect of gravity and the second control rotating shaft CS2 so as to render the first air channel 1031 in the communication state, but the invention is not limited thereto.

According to the above description, it is shown that the effect of cooling the hot spot of the light source module 10 may be achieved by rendering the first air channel 1031 in the non-communication state and guiding the cooling airflow to the left of the light emitting element 1012 of the light source 101 in FIG. 9 via the second air channel 1032 in the communication state. Therefore, the light emitting element 1012 may be prevented from having an uneven heat distribution and consequently the light emitting element 1012 of the light source 101 of the light source module 10 has extended usage life. In the embodiment as shown in FIG. 9, the hot spot is, for example, located on the left of the light emitting element 1012; and more specifically, the heat is, for example, accumulated on the left of the light emitting element 1012.

In another embodiment, the first airflow control assembly 1033 in FIG. 9 may not include the first baffle member 1035 and the second airflow control assembly 1034 in FIG. 9 may not include the second baffle member 1037 (i.e., the first airflow control assembly 1033 includes only the first baffle plate 1036 and the first control rotating shaft CS1 and the second airflow control assembly 1034 includes only the second baffle plate 1038 and the second control rotating shaft CS2). Specifically, the first baffle plate 1036 of the first airflow control assembly 1033 rotates by the effect of gravity and the first control rotating shaft CS1 so as to render the first air channel 1031 in the communication state and the second baffle plate 1038 of the second airflow control assembly 1034 rotates by the effect of gravity and the second control rotating shaft CS2 so as to also render the second air channel 1032 in the communication state, but the invention is not limited thereto.

According to the aforementioned embodiments, it is shown that the first air channel 1031 and second air channel 1032 may be operated in the non-communication state and the communication state respectively, or in the communication state and the non-communication state respectively, or both in the communication state by implementing the first airflow control assembly 1033 with no the first baffle member 1035 (i.e., the first airflow control assembly 1033 includes only the first baffle plate 1036 and the first control rotating shaft CS1) and/or implementing the second airflow control assembly 1034 with no the second baffle member 1037 (i.e., the second airflow control assembly 1034 includes only the second baffle plate 1038 and the second control rotating shaft CS2).

Further, in order to make the first baffle plate 1036 of the first airflow control assembly 1033 and the second baffle plate 1038 of the second airflow control assembly 1034 capable of rotating smoothly in the aforementioned various using states, in one embodiment both of the first baffle plate 1036 and the second baffle plate 1038 may be disposed with weighing blocks or may have increased thicknesses partially, thereby guaranteeing that the first baffle plate 1036 and the second baffle plate 1038 may rotate by the effect of gravity in various using states. In addition, in another embodiment, a spacer may be disposed between the second inner wall W2 of the first air channel 1031 and the first baffle plate 1036, thereby deviating the first baffle plate 1036 to move in a direction away from the second inner wall W2 and guaranteeing that the first baffle plate 1036 may rotate by the effect of gravity in various using states. In still another embodiment, a spacer may be disposed between the fourth inner wall W4 of the second air channel 1032 and the second baffle plate 1038, thereby deviating the second baffle plate 1038 to move in a direction away from the fourth inner wall W4 and guaranteeing that the second baffle plate 1038 may rotate by the effect of gravity in various using states.

Figure 10:
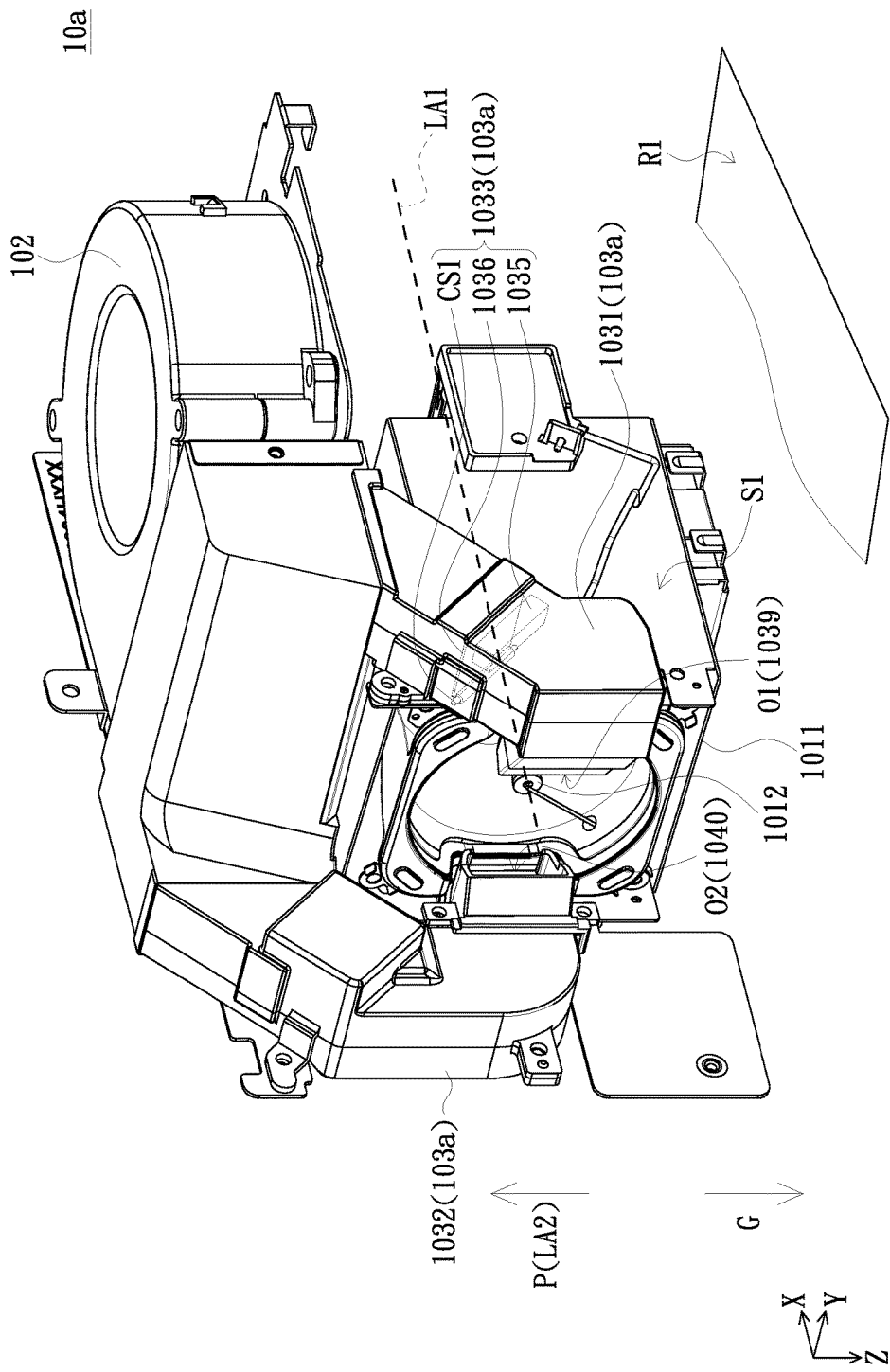
FIG. 10 is a schematic three-dimensional structural diagram of a light source module in a using state in accordance with another embodiment of the invention.

Please refer to FIG. 10, which is a schematic three-dimensional structural diagram of a light source module in a using state in accordance with another embodiment of the invention. The light source module 10a of the embodiment in FIG. 10 is similar to the light source module 10 in FIGS. 4-9. A difference lies in that only the first air channel 1031 of the flow guide device 103a in the light source module 10a of the embodiment is disposed with the first airflow control assembly 1033. Namely, in the embodiment, the second air channel 1032 of the flow guide device 103a is not disposed with any member for blocking the airflow. In the embodiment as shown in FIG. 10, when the projector is fixed to, for example, the reference plane R1 of the desktop, the first air channel 1031 and the second air channel 1032 are located above the reference plane R1; a portion of the first air channel 1031 is located between the reference plane R1 and a portion of the second air channel 1032; a portion of the second air channel 1032 is located between the reference plane R1 and a portion of the first air channel 1031; and the lamp axis LA1 of the light source 101 is parallel to the reference plane R1. Specifically, in the embodiment, the extending directions of the first air channel 1031 and the second air channel 1032 are not parallel to the reference plane R1; and the projection direction P (i.e., the light axis LA2) of the projection beam L3 provided by the lens 12 in FIG. 1 is parallel to the direction of gravity G. In the using state of the embodiment, the first baffle plate 1036 of the first airflow control assembly 1033 rotates in a direction toward the first baffle member 1035 by the effect of gravity and the first control rotating shaft CS1 until the first baffle plate 1036 leans against the first baffle member 1035, so as to render the first air channel 1031 in the non-communication state. Meanwhile, the second air channel 1032 is in the communication state due to that the second air channel 1032 does not have any member for blocking airflow. As a result, the cooling airflow provided by the fan 102 may flow to and cool the light emitting element 1012 of the light source 101 via the second air channel 1032.

Figure 11:
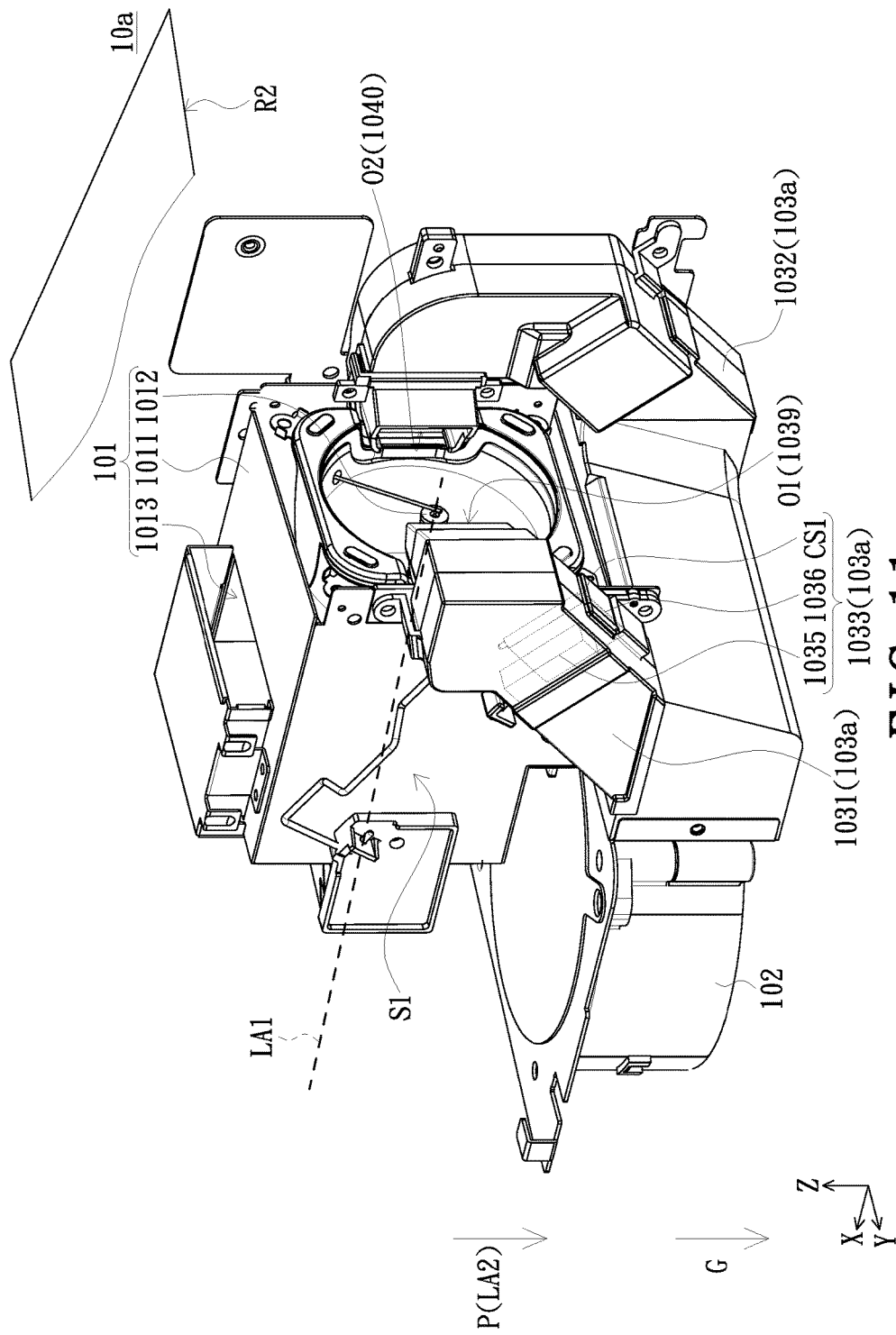
FIG. 11 is a schematic three-dimensional structural diagram of the light source module shown in FIG. 10 in another using state in accordance with an embodiment of the invention.

Please refer to FIG. 11, which is a schematic three-dimensional structural diagram of the light source module shown in FIG. 10 in another using state in accordance with an embodiment of the invention. In the embodiment, when the projector is fixed to, for example, the reference plane R2 of the ceiling, the first air channel 1031 and the second air channel 1032 are located under the reference plane R2; a portion of the first air channel 1031 is located between the reference plane R2 and a portion of the second air channel 1032; a portion of the second air channel 1032 is located between the reference plane R2 and a portion of the first air channel 1031; and the lamp axis LA1 of the light source 101 is parallel to the reference plane R2. Specifically, in the embodiment, the extending directions of the first air channel 1031 and the second air channel 1032 are not parallel to the reference plane R2; and the projection direction P (i.e., the light axis LA2) of the projection beam L3 provided by the lens 12 in FIG. 1 is parallel to the direction of gravity G. In the using state of the embodiment, the first baffle plate 1036 of the first airflow control assembly 1033 rotates in a direction away from the first baffle member 1035 by the effect of gravity and the first control rotating shaft CS1, so as to make the first baffle plate 1036 not lean against the first baffle member 1035 and render the first air channel 1031 in the communication state. Meanwhile, the second air channel 1032 is in the communication state too due to that the second air channel 1032 does not have any member for blocking airflow. As a result, the cooling airflow provided by the fan 102 may flow to and cool the light emitting element 1012 of the light source 101 via the first air channel 1031 and the second air channel 1032.

However, in one embodiment, the first airflow control assembly 1033 in FIG. 11 may not include the first baffle member 1035 (i.e., the first airflow control assembly 1033 includes only the first baffle plate 1036 and the first control rotating shaft CS1). Specifically, the first baffle plate 1036 of the first airflow control assembly 1033 rotates by the effect of gravity and the first control rotating shaft CS1 so as to render the first air channel 1031 in the communication state, but the invention is not limited thereto.

Figure 12:
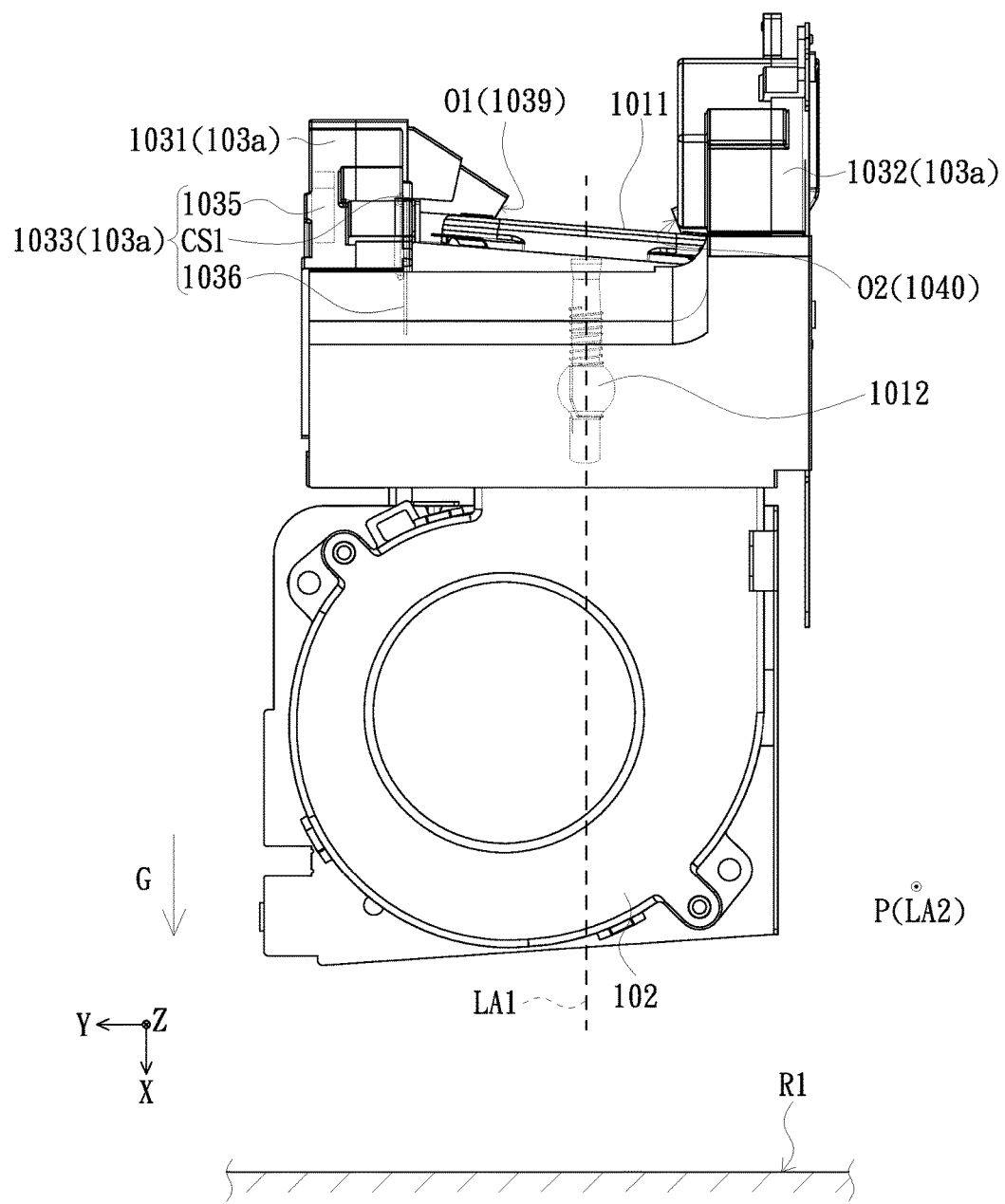
FIG. 12 is a schematic three-dimensional structural diagram of the light source module shown in FIG. 10 in another using state in accordance with an embodiment of the invention.

Please refer to FIG. 12, which is a schematic three-dimensional structural diagram of the light source module shown in FIG. 10 in another using state in accordance with an embodiment of the invention. In the embodiment, when the projector is fixed to, for example, the reference plane R1 of the desktop, the lamp axis LA1 of the light source 101 is perpendicular to the reference plane R1. Specifically, in the embodiment, the extending directions of the first air channel 1031 and the second air channel 1032 are not parallel to the reference plane R1; and the projection direction P (i.e., the light axis LA2) of the projection beam L3 provided by the lens 12 in FIG. 1 is perpendicular to the direction of gravity G. In the using state of the embodiment, the first baffle plate 1036 of the first airflow control assembly 1033 rotates in a direction away from the first baffle member 1035 by the effect of gravity and the first control rotating shaft CS1, so as to make the first baffle plate 1036 not lean against the first baffle member 1035 and render the first air channel 1031 in the communication state. Meanwhile, the second air channel 1032 is in the communication state too due to that the second air channel 1032 does not have any member for blocking airflow. As a result, the cooling airflow provided by the fan 102 may flow to and cool the light emitting element 1012 of the light source 101 via the first air channel 1031 and the second air channel 1032.

However, in one embodiment, the first airflow control assembly 1033 in FIG. 12 may not include the first baffle member 1035 (i.e., the first airflow control assembly 1033 includes only the first baffle plate 1036 and the first control rotating shaft CS1). Specifically, the first baffle plate 1036 of the first airflow control assembly 1033 rotates by the effect of gravity and the first control rotating shaft CS1 so as to render the first air channel 1031 in the communication state, but the invention is not limited thereto.

Figure 13:
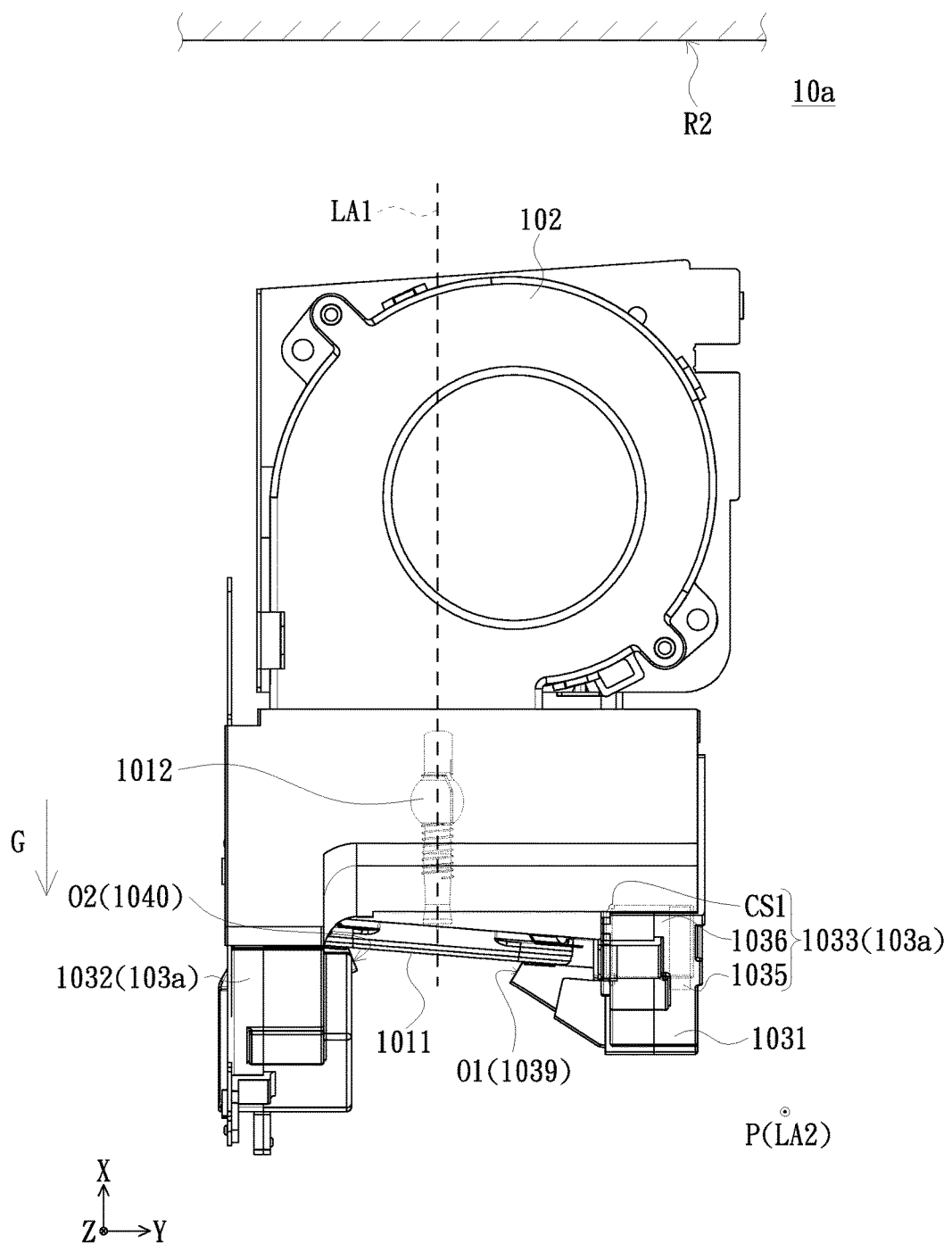
FIG. 13 is a schematic three-dimensional structural diagram of the light source module shown in FIG. 10 in another using state in accordance with an embodiment of the invention.

Please refer to FIG. 13, which is a schematic three-dimensional structural diagram of the light source module shown in FIG. 10 in another using state in accordance with an embodiment of the invention. In the embodiment, when the projector is fixed to, for example, the reference plane R2 of the ceiling, the lamp axis LA1 of the light source 101 is perpendicular to the reference plane R2. Specifically, in the embodiment, the extending directions of the first air channel 1031 and the second air channel 1032 are not parallel to the reference plane R2; and the projection direction P (i.e., the light axis LA2) of the projection beam L3 provided by the lens 12 in FIG. 1 is perpendicular to the direction of gravity G. In the using state of the embodiment, the first baffle plate 1036 of the first airflow control assembly 1033 rotates in a direction toward the first baffle member 1035 by the effect of gravity and the first control rotating shaft CS1 until the first baffle plate 1036 leans against the first baffle member 1035, so as to render the first air channel 1031 in the non-communication state. Meanwhile, the second air channel 1032 is in the communication state too due to that the second air channel 1032 does not have any member for blocking airflow. As a result, the cooling airflow provided by the fan 102 may flow to and cool the light emitting element 1012 of the light source 101 via the first air channel 1031 and the second air channel 1032.

Figure 14:
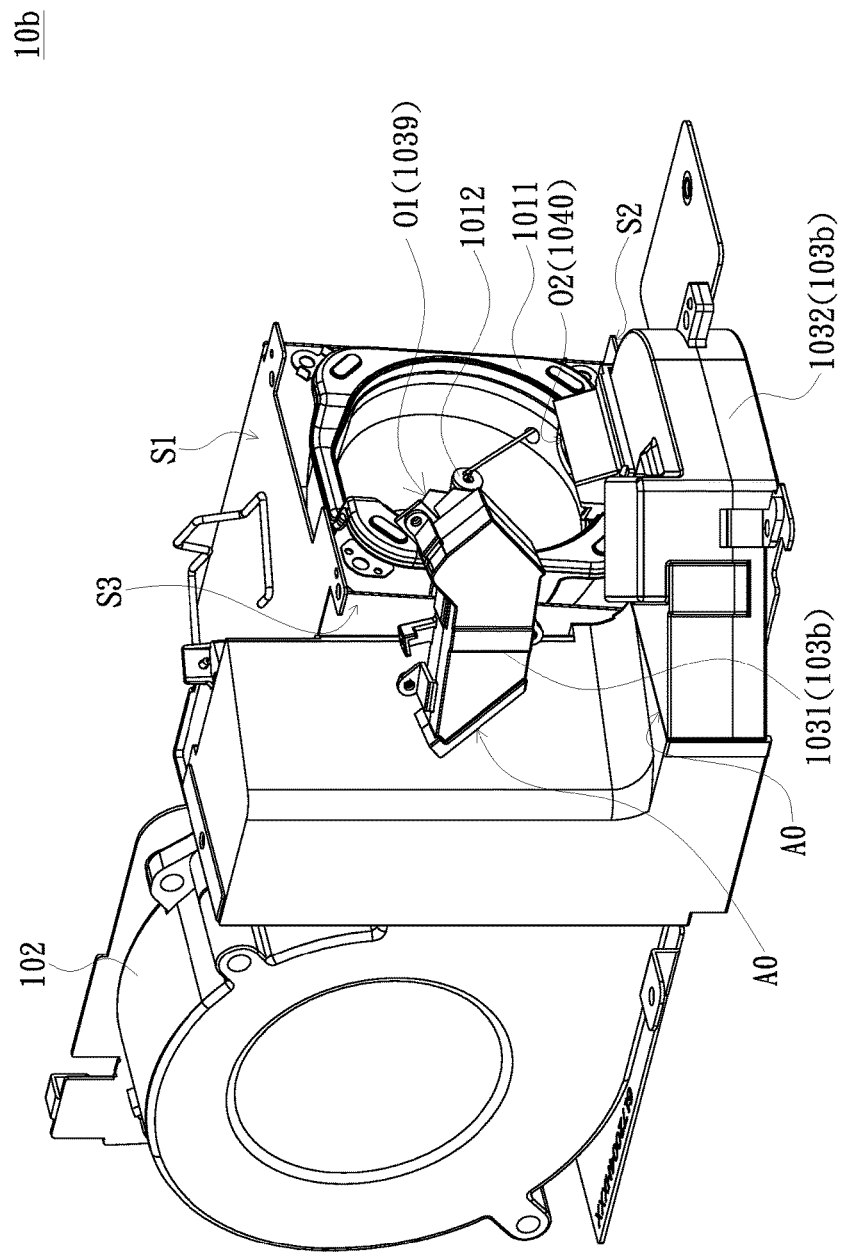
FIG. 14 is a schematic three-dimensional structural diagram of a light source module in accordance with another embodiment of the invention.

Please refer to FIG. 14, which is a schematic three-dimensional structural diagram of a light source module in accordance with another embodiment of the invention. The light source module 10b of the embodiment in FIG. 14 is similar to the light source module 10 in FIGS. 4-9 and the light source module 10a in FIG. 13. A difference lies in that in the light source module 10b of the embodiment, the first air channel 1031 of the flow guide device 103b is connected between the third side S3 of the light source 101 and the air outlet A0 of the fan 102, the second air channel 1032 of the flow guide device 103b is connected between the second side S2 of the light source 101 and the air outlet A0 of the fan 102, and the second side S2 and the third side S3 are the two adjacent sides of the housing 1011. Via the aforementioned structural design, the effect of cooling the light emitting element 1012 in various using states may be achieved by using the flow guide device 103 to guide the cooling airflow provide by the fan 102 to the light emitting element 1012 of the light source 101.

However, to improve the convenience of using of the projector 1, the lamp axis LA1 is not limited to be parallel or perpendicular to the reference plane R1 (such as a desktop)/reference plane R2 (such as a ceiling). For example, in order to achieve the balance between the downsizing of the volume of the projector 1 and avoiding the light emitting element 1012 to have even heat distribution, the angle between the lamp axis LA1 and the reference plane R1 (such as a desktop)/reference plane R2 (such as a ceiling) may be designed to be 0 degree to 45 degrees in one embodiment; the angle between the lamp axis LA1 and the reference plane R1 (such as a desktop)/reference plane R2 (such as a ceiling) may be designed to be 45 degrees to 90 degrees in another embodiment; and the invention is not limited thereto. More specifically, the angle between the lamp axis LA1 and the reference plane R1 (such as a desktop)/reference plane R2 (such as a ceiling) may be designed to be 0 degree to 20 degrees in one embodiment; the angle between the lamp axis LA1 and the reference plane R1 (such as a desktop)/reference plane R2 (such as a ceiling) may be designed to be 70 degrees to 90 degrees in another embodiment; the angle between the lamp axis LA1 and the reference plane R1 (such as a desktop)/reference plane R2 (such as a ceiling) is designed to, for example, 3 degrees, 7 degrees, 87 degrees or 83 degrees in still another embodiment; and the invention is not limited thereto.

In summary, the light source module of the projector of the embodiment of the invention includes the first airflow control assembly adapted to control the first air channel either in the communication state or in the non-communication state via an effect of gravity. Through the design of inclining the first control rotating shaft relative to the lamp axis with an included angle greater than 0 degree and less than 90 degrees, it is guaranteed that the cooling airflow provided by the fan may be guided to the light source in various using states. Consequently, the light source module has qualified cooling effect in various using states and the light source has extended usage life when the projector is operated in various using states. In the embodiment of the invention, the light source module includes the first airflow control assembly and the second airflow control assembly, and the first airflow control assembly and the second airflow control assembly are adapted to respectively control the first air channel and the second air channel either in the communication state or in the non-communication state via an effect of gravity; wherein the first control rotating shaft of the first airflow control assembly is inclined relative to the lamp axis and the included angle between the first control rotating shaft and the lamp axis is greater than 0 degree and less than 90 degrees; wherein the second control rotating shaft of the second airflow control assembly is inclined relative to the lamp axis and the included angle between the second control rotating shaft and the lamp axis is greater than 0 degree and less than 90 degrees. In the embodiment of the invention, the second air channel is in the non-communication state when the first air channel is in the communication state. In the embodiment of the invention, the second air channel is in the communication state when the first air channel is in the non-communication state. In the embodiment of the invention, when the first air channel is in the communication state, the second air channel is also in the communication state. In the embodiment of the invention, the first airflow control assembly may not include the first baffle member (i.e., the first airflow control assembly includes only the first baffle plate and the first control rotating shaft) thereby rendering the first air channel either in the communication state or in the non-communication state. In the embodiment of the invention, the second airflow control assembly may not include the second baffle member (i.e., the second airflow control assembly includes only the second baffle plate and the second control rotating shaft) thereby rendering the second air channel either in the communication state or in the non-communication state.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projector, comprising:
   a light source module, comprising:
      a light source, having a lamp axis and adapted to provide an illumination beam;
      a fan, adapted to provide a cooling airflow; and
      a flow guide device, disposed between the light source and the fan and adapted to guide a flowing direction of the cooling airflow, and the flow guide device comprising:
         a first air channel, connected between a first side of the light source and an air outlet of the fan;
         a second air channel, connected between a second side of the light source and the air outlet of the fan;
         a first airflow control assembly, disposed in the first air channel and adapted to control the first air channel either in a communication state or in a non-communication state via an effect of gravity, wherein when the first air channel is in the communication state, the cooling airflow flows from the fan to the light source via the first air channel, wherein the first airflow control assembly comprises:
            a first control rotating shaft, wherein the first control rotating shaft is inclined relative to the lamp axis and a first included angle is between the first control rotating shaft and the lamp axis, and the first included angle is greater than 0 degree and less than 90 degrees;
            a first baffle member, fixedly disposed on a first inner wall of the first air channel and protruding from the first inner wall, wherein the first baffle member has a first side surface facing an air inlet of the first air channel; and
            a first baffle plate, adapted to lean against the first side surface of the first baffle member and pivotally connected to the first control rotating shaft, wherein the first baffle plate is disposed between the first baffle member and the air inlet of the first air channel, the first control rotating shaft is disposed on a second inner wall of the first air channel, the second inner wall is adjacent to the light source and the first inner wall is away from the light source, wherein the first air channel is in the non-communication state when the first baffle plate is controlled by the effect of gravity to lean against the first side surface of the first baffle member, wherein the first air channel is in the communication state when the first baffle plate is controlled by the effect of gravity to not lean against the first side surface of the first baffle member; and
         a second airflow control assembly, disposed in the second air channel and adapted to control the second air channel either in the communication state or in the non-communication state via the effect of gravity, wherein when the second air channel is in the non-communication state, the second airflow control assembly blocks the cooling airflow to flow from the fan to the light source and the first air channel is in the communication state, wherein the first air channel is in the non-communication state when the second air channel is in the communication state, wherein the second airflow control assembly comprises:
            a second control rotating shaft, wherein the second control rotating shaft is inclined relative to the lamp axis and a second included angle is between the second control rotating shaft and the lamp axis, and the second included angle is greater than 0 degree and less than 90 degrees;
            a second baffle member, fixedly disposed on a third inner wall of the second air channel and protruding from the third inner wall, wherein the second baffle member has a second side surface facing away from an air inlet of the second air channel; and
            a second baffle plate, adapted to lean against the second side surface of the second baffle member and pivotally connected to the second control rotating shaft, wherein the second baffle member is disposed between the second baffle plate and the air inlet of the second air channel, the second control rotating shaft is disposed on a fourth inner wall of the second air channel, the fourth inner wall is adjacent to the light source and the third inner wall is away from the light source, wherein the second air channel is in the non-communication state when the second baffle plate is controlled by the effect of gravity to lean against the second side surface of the second baffle member, wherein the second air channel is in the communication state when the second baffle plate is controlled by the effect of gravity to not lean against the second side surface of the second baffle member;
   a light valve, disposed on a transmission path of the illumination beam and adapted to convert the illumination beam into an image beam; and
   a lens, disposed on a transmission path of the image beam and adapted to convert the image beam into a projection beam.

2. The projector according to claim 1, wherein when the first air channel is in the non-communication state, the first airflow control assembly blocks the cooling airflow to flow from the fan to the light source so as to make the cooling airflow not flow from the fan to the light source via the first air channel, wherein when the second air channel is in the communication state, the cooling airflow flows from the fan to the light source via the second air channel, wherein when the second air channel is in the non-communication state, the cooling airflow not flows from the fan to the light source via the second air channel.

3. The projector according to claim 1, wherein the projector is adapted to fix to a reference plane and the lamp axis is parallel or perpendicular to the reference plane, wherein the second air channel is in the non-communication state when the first air channel is in the communication state, or wherein the second air channel is in the communication state when the first air channel is in the non-communication state, or wherein the second air channel is in the communication state when the first air channel is in the communication state.

4. The projector according to claim 1, wherein the projector is adapted to fix to a reference plane and an angle between the lamp axis and the reference plane is between 0 and 45 degrees, wherein the second air channel is in the non-communication state when the first air channel is in the communication state, or wherein the second air channel is in the communication state when the first air channel is in the non-communication state, or wherein the second air channel is in the communication state when the first air channel is in the communication state.

5. The projector according to claim 1, wherein the projector is adapted to fix to a reference plane and an angle between the lamp axis and the reference plane is between 45 and 90 degrees, wherein the second air channel is in the non-communication state when the first air channel is in the communication state, or wherein the second air channel is in the communication state when the first air channel is in the non-communication state, or wherein the second air channel is in the communication state when the first air channel is in the communication state.

6. The projector according to claim 1, wherein the projector is adapted to fix to a reference plane and the lamp axis is parallel to the reference plane, wherein when the first air channel is in the communication state, the second baffle plate leans against the second baffle member so as to render the second air channel in the non-communication state, wherein when the first air channel is in the non-communication state, the second baffle plate does not lean against the second baffle member so as to render the second air channel in the communication state.

7. The projector according to claim 1, wherein the projector is adapted to fix to a reference plane and the lamp axis is perpendicular to the reference plane, wherein when the first air channel is in the communication state, the second baffle plate leans against the second baffle member so as to render the second air channel in the non-communication state, wherein when the first air channel is in the non-communication state, the second baffle plate does not lean against the second baffle member so as to render the second air channel in the communication state.

8. The projector according to claim 1, wherein the projector is adapted to fix to a reference plane and the lamp axis is parallel or perpendicular to the reference plane, wherein both of the first air channel and the second air channel are in the communication state.

9. The projector according to claim 1, wherein the projector is adapted to fix to a reference plane and an angle between the lamp axis and the reference plane is between 0 and 45 degrees, wherein the second air channel is in the non-communication state when the first air channel is in the communication state, or wherein the second air channel is in the communication state when the first air channel is in the non-communication state, or wherein the second air channel is in the communication state when the first air channel is in the communication state.

10. The projector according to claim 1, wherein the projector is adapted to fix to a reference plane and an angle between the lamp axis and the reference plane is between 45 and 90 degrees, wherein the second air channel is in the non-communication state when the first air channel is in the communication state, or wherein the second air channel is in the communication state when the first air channel is in the non-communication state, or wherein the second air channel is in the communication state when the first air channel is in the communication state.

11. The projector according to claim 1, wherein both of the first included angle and the second included angle are 45 degrees.

12. The projector according to claim 1, wherein the first included angle is 45 degrees.

13. The projector according to claim 1, wherein the flow guide device further comprises:
   a first flow guide unit, disposed between the first air channel and the light source, having a first outlet, wherein the first outlet faces the light source; and
   a second flow guide unit, disposed between the second air channel and the light source, having a second outlet, wherein the second outlet faces the light source.

14. The projector according to claim 1, wherein the light source comprises a housing and a light emitting element disposed in the housing, the housing has at least one opening, wherein the cooling airflow is guided to the light emitting element in the housing via the flow guide device and flows out via the at least one opening.

15. The projector according to claim 14, wherein the first air channel and the second air channel are respectively connected to two opposite sides of the housing of the light source or respectively connected to two adjacent sides of the housing of the light source.

16. A light source module, adapted to be used for a projector, the light source module comprising:
   a light source, having a lamp axis;
   a fan, adapted to provide a cooling airflow; and
   a flow guide device, disposed between the light source and the fan and adapted to guide a flowing direction of the cooling airflow, and the flow guide device comprising:
      a first air channel, connected between a first side of the light source and an air outlet of the fan;
      a second air channel, connected between a second side of the light source and the air outlet of the fan;
      a first airflow control assembly, disposed in the first air channel and adapted to control the first air channel either in a communication state or in a non-communication state via an effect of gravity, wherein when the first air channel is in the communication state, the cooling airflow flows from the fan to the light source via the first air channel, wherein the first airflow control assembly comprises:
         a first control rotating shaft, wherein the first control rotating shaft is inclined relative to the lamp axis and a first included angle is between the first control rotating shaft and the lamp axis, and the first included angle is greater than 0 degree and less than 90 degrees-;
         a first baffle member, fixedly disposed on a first inner wall of the first air channel and protruding from the first inner wall, wherein the first baffle member has a first side surface facing an air inlet of the first air channel; and a first baffle plate, adapted to lean against the first side surface of the first baffle member and pivotally connected to the first control rotating shaft, wherein the first baffle plate is disposed between the first baffle member and the air inlet of the first air channel, the first control rotating shaft is disposed on a second inner wall of the first air channel, the second inner wall is adjacent to the light source and the first inner wall is away from the light source, wherein the first air channel is in the non-communication state when the first baffle plate is controlled by the effect of gravity to lean against the first side surface of the first baffle member, wherein the first air channel is in the communication state when the first baffle plate is controlled by the effect of gravity to not lean against the first side surface of the first baffle member; and a second airflow control assembly, disposed in the second air channel and adapted to control the second air channel either in the communication state or in the non-communication state via the effect of gravity, wherein when the second air channel is in the non-communication state, the second airflow control assembly blocks the cooling airflow to flow from the fan to the light source and the first air channel is in the communication state, wherein the first air channel is in the non-communication state when the second air channel is in the communication state, wherein the second airflow control assembly comprises:

a second control rotating shaft, wherein the second control rotating shaft is inclined relative to the lamp axis and a second included angle is between the second control rotating shaft and the lamp axis, and the second included angle is greater than 0 degree and less than 90 degrees;

a second baffle member, fixedly disposed on a third inner wall of the second air channel and protruding from the third inner wall, wherein the second baffle member has a second side surface facing away from an air inlet of the second air channel; and a second baffle plate, adapted to lean against the second side surface of the second baffle member and pivotally connected to the second control rotating shaft, wherein the second baffle member is disposed between the second baffle plate and the air inlet of the second air channel, the second control rotating shaft is disposed on a fourth inner wall of the second air channel, the fourth inner wall is adjacent to the light source and the third inner wall is away from the light source, wherein the second air channel is in the non-communication state when the second baffle plate is controlled by the effect of gravity to lean against the second side surface of the second baffle member, wherein the second air channel is in the communication state when the second baffle plate is controlled by the effect of gravity to not lean against the second side surface of the second baffle member.

17. The light source module according to claim 16, wherein the projector is adapted to fix to a reference plane and the lamp axis is parallel or perpendicular to the reference plane, wherein the second air channel is in the non-communication state when the first air channel is in the communication state, or wherein the second air channel is in the communication state when the first air channel is in the non-communication state, or wherein the second air channel is in the communication state when the first air channel is in the communication state.

18. The light source module according to claim 16, wherein the projector is adapted to fix to a reference plane and an angle between the lamp axis and the reference plane is between 0 and 45 degrees, wherein the second air channel is in the non-communication state when the first air channel is in the communication state, or wherein the second air channel is in the communication state when the first air channel is in the non-communication state, or wherein the second air channel is in the communication state when the first air channel is in the communication state.

19. The light source module according to claim 16, wherein the projector is adapted to fix to a reference plane and an angle between the lamp axis and the reference plane is between 45 and 90 degrees, wherein the second air channel is in the non-communication state when the first air channel is in the communication state, or wherein the second air channel is in the communication state when the first air channel is in the non-communication state, or wherein the second air channel is in the communication state when the first air channel is in the communication state.

20. The light source module according to claim 16, wherein the projector is adapted to fix to a reference plane and the lamp axis is parallel to the reference plane, wherein when the first air channel is in the communication state, the second baffle plate leans against the second baffle member so as to render the second air channel in the non-communication state, wherein when the first air channel is in the non-communication state, the second baffle plate does not lean against the second baffle member so as to render the second air channel in the communication state.

21. The light source module according to claim 16, wherein the projector is adapted to fix to a reference plane and the lamp axis is perpendicular to the reference plane, wherein when the first air channel is in the communication state, the second baffle plate leans against the second baffle member so as to render the second air channel in the non-communication state, wherein when the first air channel is in the non-communication state, the second baffle plate does not lean against the second baffle member so as to render the second air channel in the communication state.

22. The light source module according to claim 16, wherein the projector is adapted to fix to a reference plane and the lamp axis is parallel or perpendicular to the reference plane, wherein both of the first air channel and the second air channel are in the communication state.

23. The light source module according to claim 16, wherein the projector is adapted to fix to a reference plane and an angle between the lamp axis and the reference plane is between 0 and 45 degrees, wherein the second air channel is in the non-communication state when the first air channel is in the communication state, or wherein the second air channel is in the communication state when the first air channel is in the non-communication state, or wherein the second air channel is in the communication state when the first air channel is in the communication state.

24. The light source module according to claim 16, wherein the projector is adapted to fix to a reference plane and an angle between the lamp axis and the reference plane is between 45 and 90 degrees, wherein the second air channel is in the non-communication state when the first air channel is in the communication state, or wherein the second air channel is in the communication state when the first air channel is in the non-communication state, or wherein the second air channel is in the communication state when the first air channel is in the communication state.

25. The light source module according to claim 16, wherein both of the first included angle and the second included angle are 45 degrees.

26. The light source module according to claim 16, wherein the first included angle is 45 degrees.

27. The light source module according to claim 16, wherein the flow guide device further comprises:
   a first flow guide unit, disposed between the first air channel and the light source, having a first outlet, wherein the first outlet faces the light source; and
   a second flow guide unit, disposed between the second air channel and the light source, having a second outlet, wherein the second outlet faces the light source.

28. The light source module according to claim 16, wherein the light source comprises a housing and a light emitting element disposed in the housing, the housing has at least one opening, wherein the cooling airflow is guided to the light emitting element in the housing via the flow guide device and flows out via the at least one opening.

29. The light source module according to claim 28, wherein the first air channel and the second air channel are respectively connected to two opposite sides of the housing of the light source or respectively connected to two adjacent sides of the housing of the light source.

* * * * *